United States Patent [19]
Nakamura et al.

[11] Patent Number: 6,157,600
[45] Date of Patent: Dec. 5, 2000

[54] TILT DETECTION DEVICE, OPTICAL DISC DEVICE, AND TILT CONTROL METHOD

[75] Inventors: Atsushi Nakamura, Kadoma; Mamoru Shoji, Sakai; Takashi Ishida, Yawata, all of Japan

[73] Assignee: Matsushita Electric Industrial Co., Ltd., Osaka, Japan

[21] Appl. No.: 09/379,496

[22] Filed: Aug. 23, 1999

Related U.S. Application Data

[62] Division of application No. 09/352,203, Jul. 13, 1999.

[30] Foreign Application Priority Data

Sep. 14, 1998 [JP] Japan .................................. 10-259904
Dec. 22, 1998 [JP] Japan .................................. 10-364549

[51] Int. Cl.⁷ ....................................................... G11B 7/00
[52] U.S. Cl. ...................................... 369/44.32; 369/44.41
[58] Field of Search ............................ 369/275.3, 275.2, 369/44.13, 44.26, 44.32, 54, 58

[56] References Cited

U.S. PATENT DOCUMENTS

| | | | |
|---|---|---|---|
| 5,898,654 | 4/1999 | Shimada et al. | 369/44.32 |
| 5,963,516 | 10/1999 | Hashimoto et al. | 369/44.32 |
| 5,978,332 | 11/1999 | Itakura et al. | 369/44.32 |

FOREIGN PATENT DOCUMENTS

| | | |
|---|---|---|
| 0210330 | 2/1987 | European Pat. Off. . |
| 0468613 | 1/1992 | European Pat. Off. . |
| 3643572 | 6/1987 | Germany . |
| 59-191143 | 10/1984 | Japan . |
| 1-312744 | 12/1989 | Japan . |
| 2-287924 | 11/1990 | Japan . |
| 4-10231 | 1/1992 | Japan . |
| 7-302428 | 11/1995 | Japan . |
| 10-083537 | 3/1998 | Japan . |
| 10-312565 | 11/1998 | Japan . |
| 11-144281 | 5/1999 | Japan . |
| 11-161987 | 6/1999 | Japan . |

OTHER PUBLICATIONS

Patent Abstracts of Japan, vol. 014, No. 098 (P–1011), Feb. 22, 1990 & JP 01 302546 A (Sankyo Seiki Mfg. Co. Ltd.), Dec. 6, 1989.

Patent Abstracts of Japan, vol. 012, No. 413 (P–780), Nov. 2, 1988 & JP 63 149841 A (Hitachi Ltd.) Jun. 22, 1988.

Patent Abstracts of Japan, vol. 011, No. 298 (P–620), Sep. 26, 1987 & JP 62 089246 A (Sankyo Seiki Mfg. Co. Ltd.), Apr. 23, 1987.

*Primary Examiner*—Nabil Hindi
*Attorney, Agent, or Firm*—Wenderoth, Lind & Ponack, L.L.P.

[57] ABSTRACT

A tilt detection device detects an inclination (tilt angle) of the recording surface of an optical disc with respect to the optical axis of the light beam. The device has an optical head for directing a light beam onto the optical disc, a photo detector for receiving light reflected from the optical disc, and a tilt detector for detecting inclination of the recording surface of the optical disc with respect to the optical axis of the light beam by a signal output from the photo detector.

21 Claims, 25 Drawing Sheets

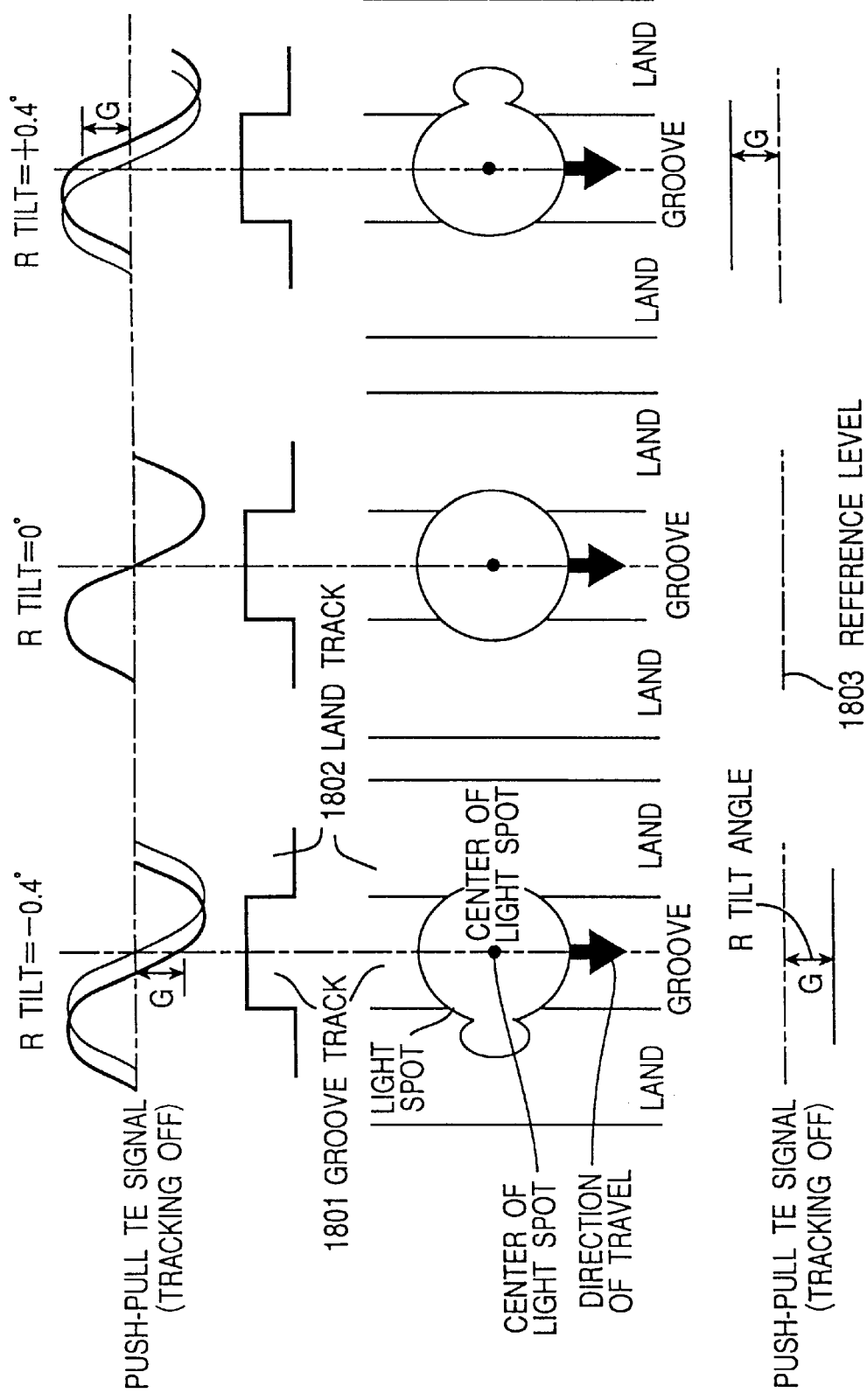

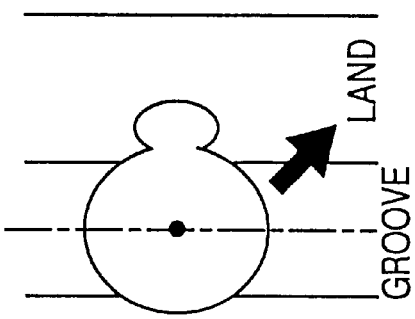
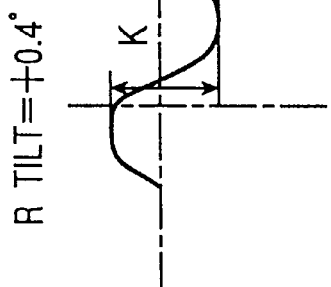
Fig. 19A  Fig. 19B  Fig. 19C
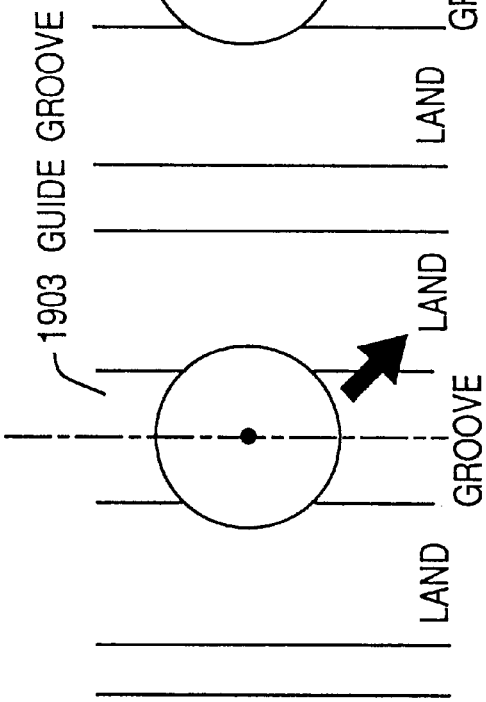
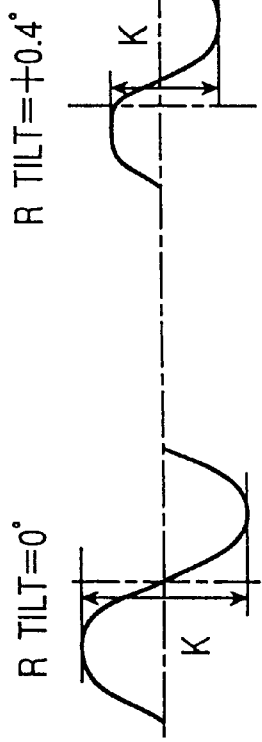
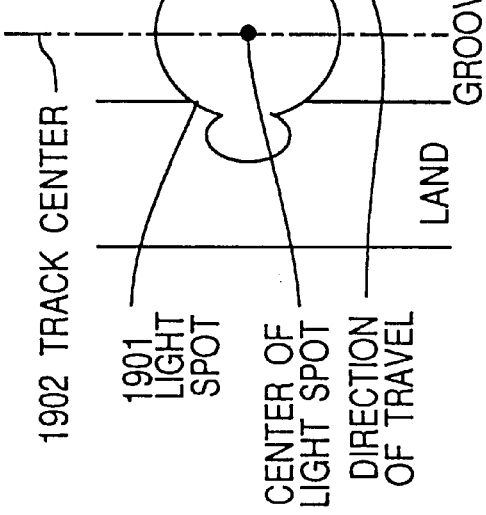
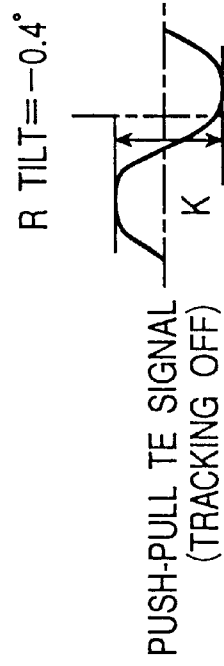

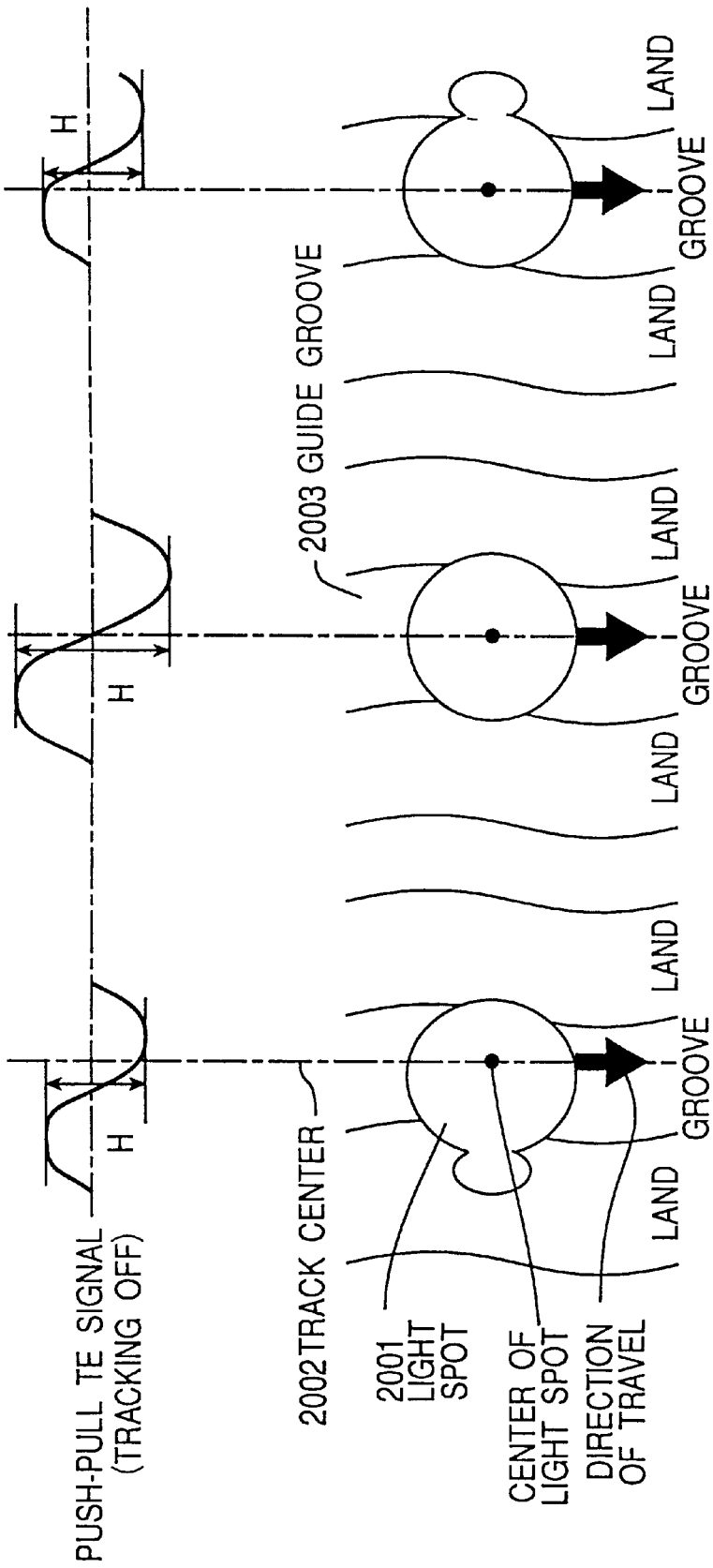

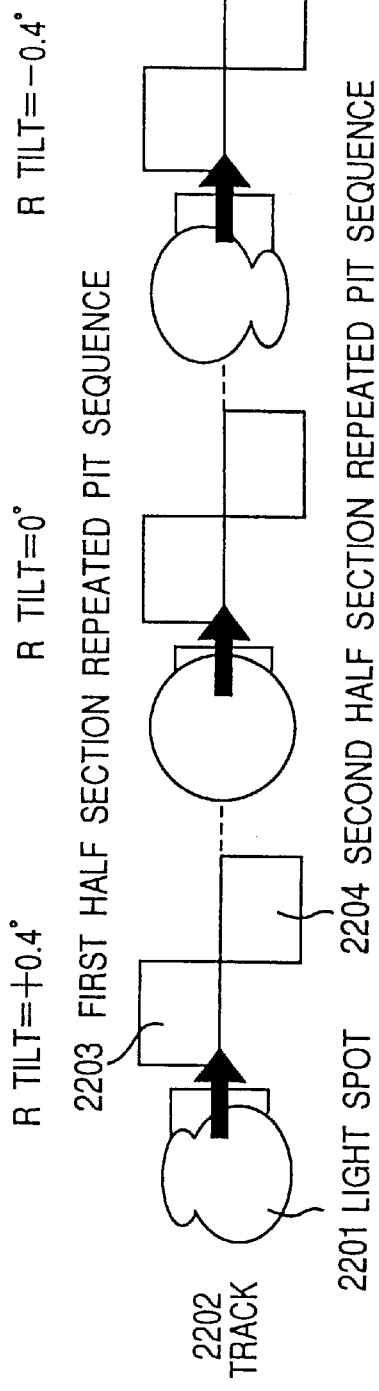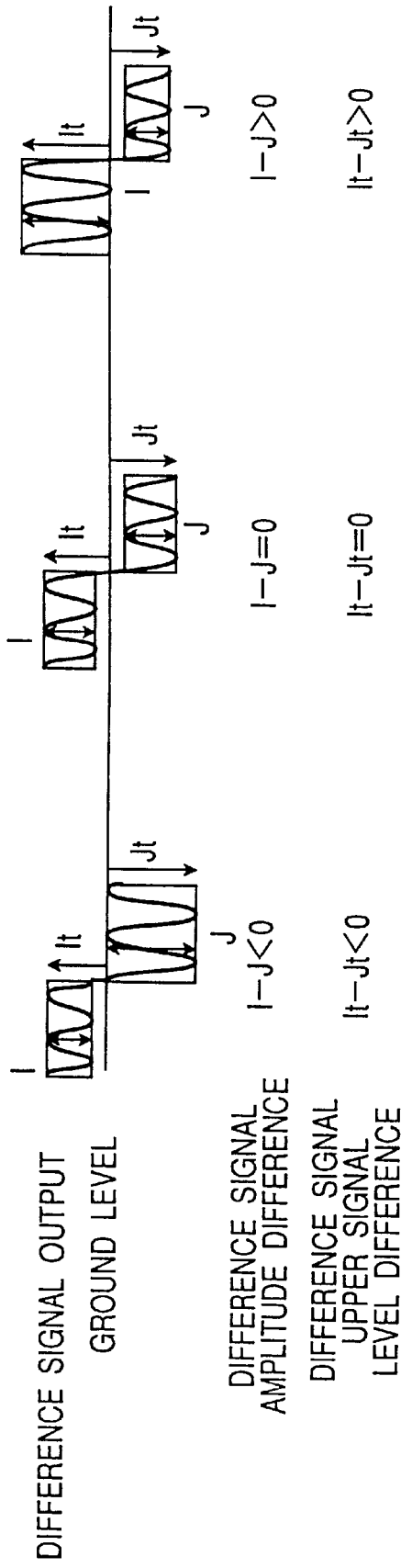

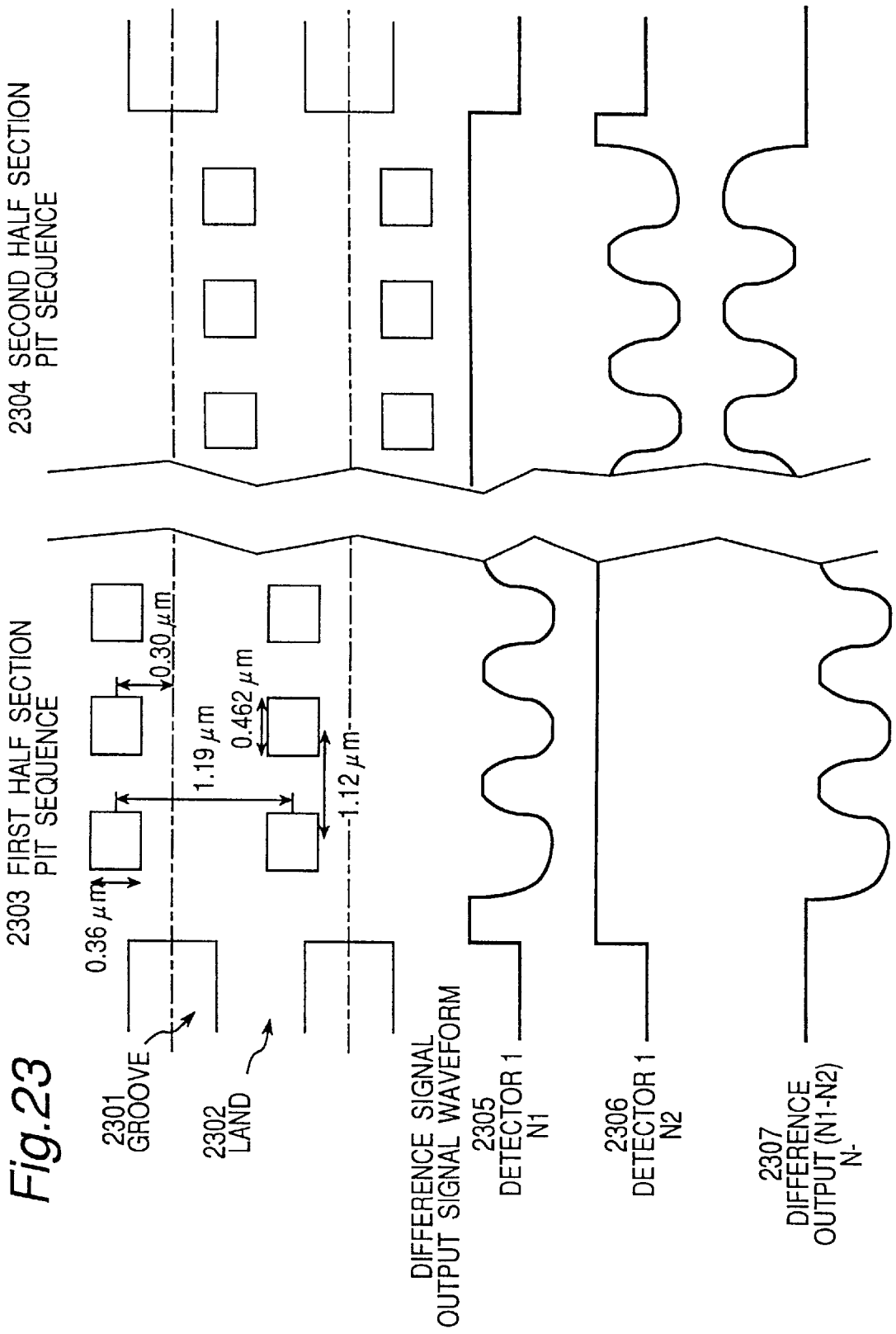

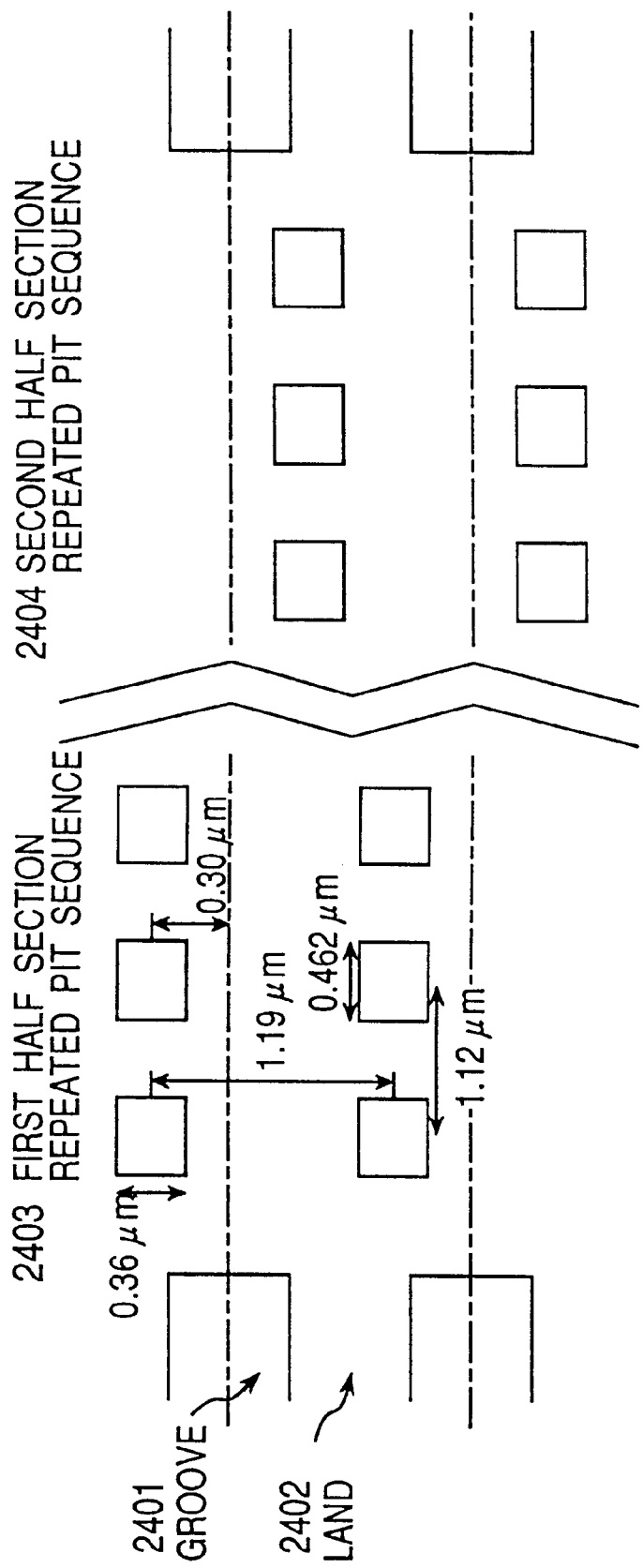

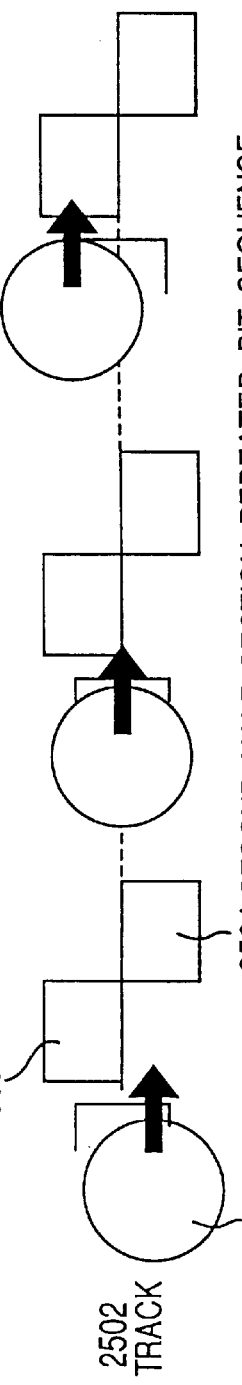

Fig.26
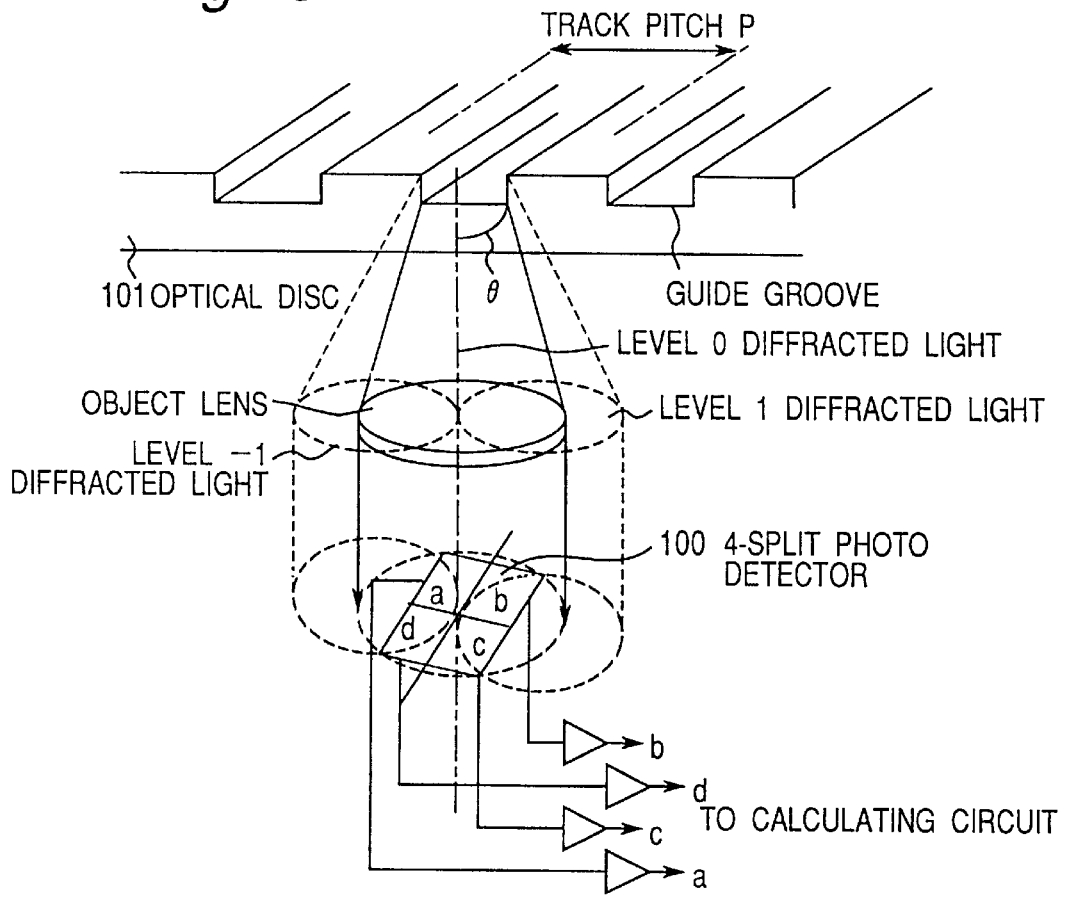
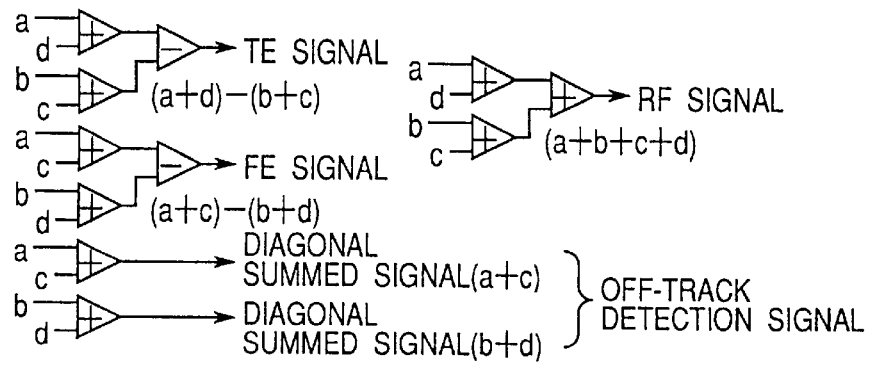

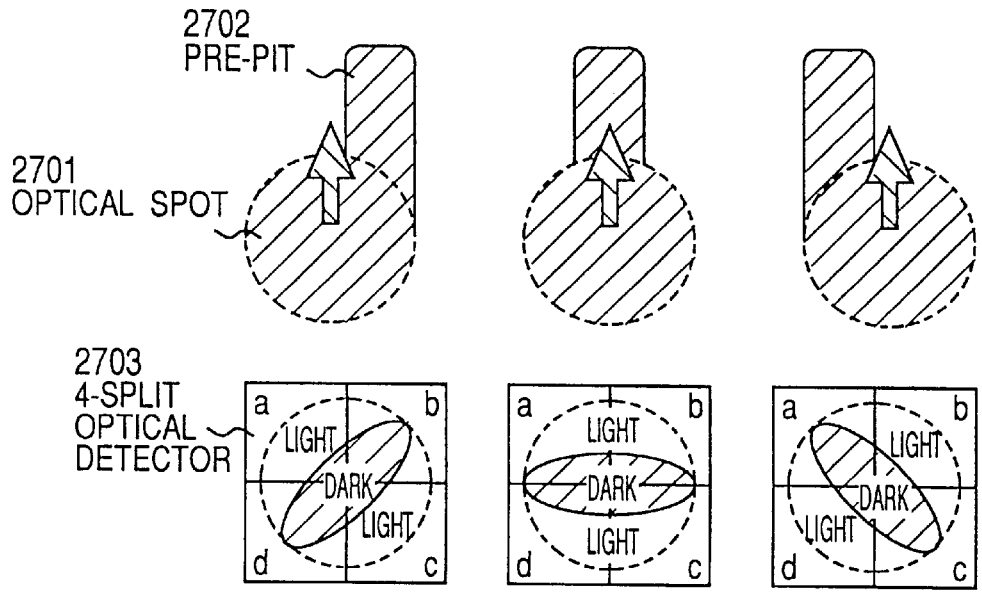
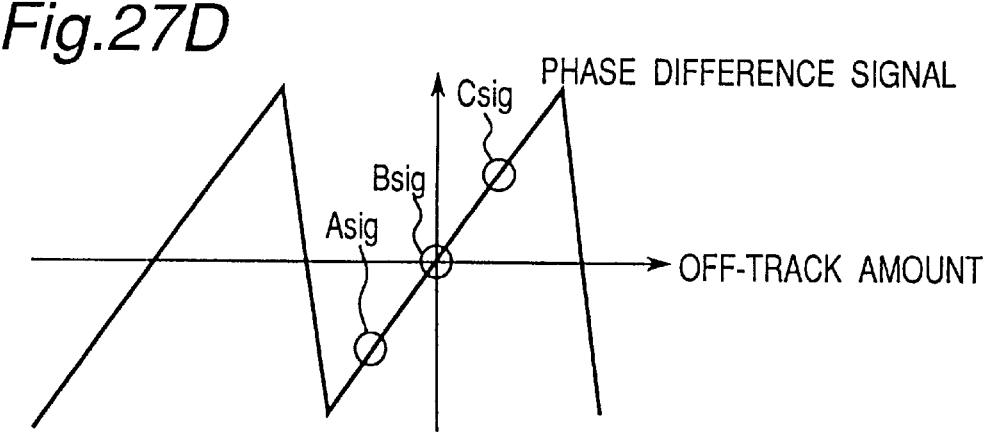

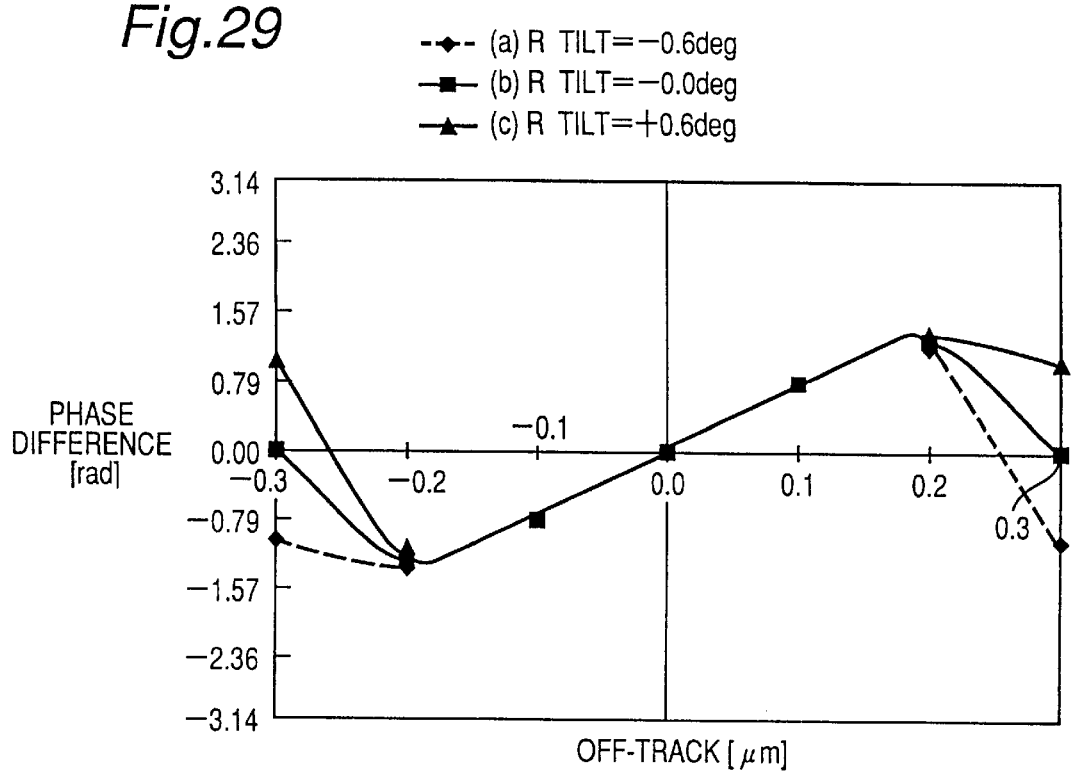

TILT DETECTION DEVICE, OPTICAL DISC DEVICE, AND TILT CONTROL METHOD

This is a Rule 1.53(b) Divisional Application of Ser. No. 09/352,203, filed Jul. 13, 1999.

BACKGROUND OF THE INVENTION

1. Field of the Invention

The present invention relates to an optical disc for storing information by irradiating laser light onto an optical disc medium, and an optical disc device for same.

2. Description of the Related Art

In recent years, great developments have been made in optical disc devices as means for storing and reproducing large volumes of data, and approaches for achieving high storage density have been adopted, one of these methods being a phase change-type optical disc device utilizing reversible crystal - non-crystal state changes.

In a phase change-type optical disc device, marks (amorphous sections) and spaces (crystalline sections) between these marks are formed on an optical disc medium, by irradiating semiconductor laser light onto the optical disc medium using two power settings: a peak power for rendering crystalline regions amorphous, and a bias power for crystallizing amorphous regions.

Land/groove recording technology exists for recording these marks and spaces in tracks in both the land region and the groove region of a guide groove on a disc.

In order to improve the reliability of optical discs, it is necessary to store and reproduce high-quality signals on the optical disc. If there is an inclination (tilt angle) of the recording surface of an optical disc with respect to the optical axis of the light beam, then an aberration occurs in the light spot and it becomes difficult to record and reproduce high-quality signals on the optical disc. Therefore, in order to record and reproduce signals to and from the optical disc, it is necessary to detect the aforementioned tilt angle accurately, and to correct this tilt angle.

A conventional method for correcting tilt by a tilt device is shown in FIG. 2.

In FIG. 2, 201 is an optical disc, 202 is an optical head which focuses a light beam onto the optical disc, 203 is a tilt platform, 204 is a signal calculating circuit, 205 denotes focus control means for controlling the focal position of the light spot on the optical disc surface, 206 denotes tracking control means for controlling the position of the optical spot on the track, 207 is a tilt sensor for irradiating light for detecting the inclination of the optical disc signal with respect to the optical axis of the aforementioned optical beam, onto the optical disc, receiving light reflected by the optical disc, and detecting the inclination of the recording surface of the optical disc with respect to the optical axis of the aforementioned light beam, and 208 denotes tilt control means for controlling the inclination of the recording surface of the aforementioned optical disc with respect to the optical axis of the aforementioned light beam, by inclining the aforementioned tilt platform according to the value detected by the aforementioned tilt sensor.

FIG. 3 shows a graph of a case where the tilt position is corrected at both the inner circumference and outer circumference of the optical disc, in a conventional optical disc device.

SUMMARY OF THE INVENTION

However, in the conventional composition, since a tilt sensor and tilt controlling means as illustrated in FIG. 2 are used to detect the tilt position of the optical disc, it has been necessary to provide a tilt sensor 207 for detecting tilt, separately from the optical head 202, in order to correct the inclination of the recording surface of the optical disc with respect to the optical axis of the optical beam. The incorporation of two optical systems in the optical head and the tilt sensor makes the optical disc device more complex, increases the space occupied by the device, and leads to cost rises. Moreover, the optical axes of the two optical systems in the optical head and the tilt sensor must be adjusted, and therefore adjustment tasks become more complex, and errors are liable to occur between the tilt sensor and the inclination (tilt angle) of the recording surface of the optical disc with respect to the optical axis of the aforementioned optical beam, making it difficult to detect the tilt angle accurately.

The present invention overcomes all of the aforementioned problems, an object thereof being to improve the quality of the light spot and recording and reproduction characteristics by correcting the inclination of the optical disc with respect to the optical axis of the light beam at radial positions at the inner circumference, middle circumference and outer circumference of the optical disc, in such a manner that the value detected by the tilt detecting means is a suitable value.

In order to resolve the aforementioned problems, the present invention comprises the following aspects.

The first aspect of the invention corresponds to method (1) in the embodiments.

The first aspect is a tilt detection device for detecting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on a track; and tilt detecting means for detecting inclination of the recording surface of the optical disc with respect to the optical axis of said light beam by a difference signal output representing the difference between the signals from said first and second photo detecting elements when reflected light from said continuous track is received by the two-split photo detector.

Thereby, it is possible to improve signal quality during recording and reproduction, by detecting the tilt angle by pits recorded previously in the optical disc, without needing to provide an optical system for detecting the tilt angle separately from the optical system for recording and reproducing signals. Consequently, this has the effect of reducing the installation size of the device and lowering costs.

The second aspect of the invention corresponds to method (4) in the embodiments.

The second aspect is a tilt detection device detecting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on a track; and tilt detecting means for detecting inclination of the recording surface of the optical disc, by comparing a first summed signal representing the sum of the outputs from the first and second photo detecting elements when reflected light from said first shifted pits is received by the two-split photo detector, with a second summed signal representing the sum of the outputs from the first and second photo detecting elements when reflected light from said second shifted pits is received by the two-split photo detector.

The third aspect of the invention corresponds to method (4) in the embodiments, and in particular, to the lower signal level illustrated in FIGS. 21A, 21B and 21C.

The third aspect is the tilt detection device according to the second aspect of the invention, wherein said tilt detecting means compares the lower level of the absolute value of the envelope signal of the first summed signal with the lower level of the absolute value of the envelope signal of the second summed signal.

The fourth aspect of the invention corresponds to method (4) in the embodiments, and in particular, to the upper signal level illustrated in FIGS. 21A, 21B and 21C.

The fourth aspect is the tilt detection device according to the second aspect of the invention, wherein said tilt detecting means compares the upper level of the absolute value of the envelope signal of the first summed signal with the upper level of the absolute value of the envelope signal of the second summed signal.

The fifth aspect of the invention corresponds to method (4) in the embodiments, and in particular, to the amplitude illustrated in FIGS. 21A, 21B and 21C.

The fifth aspect is the tilt detection device according to the second aspect of the invention, wherein the tilt detecting means compares the amplitude of the first summed signal with the amplitude of the second summed signal.

The sixth aspect of the invention corresponds to method (5) in the embodiments.

The sixth aspect is a tilt detection device for detecting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on a track; and tilt detecting means for detecting inclination of the recording surface of the optical disc, by comparing a first difference signal representing the difference between the outputs from the first and second photo detecting elements when reflected light from said first shifted pits is received by said two-split photo detector, with a second difference signal representing the difference between the outputs from the first and second photo detecting elements when reflected light from said second shifted pits is received by said two-split photo detector.

The seventh aspect of the invention corresponds to method (5) in the embodiments, and in particular, to the lower signal level illustrated in FIGS. 22A, 22B and 22C.

The seventh aspect is the tilt detection device according to the sixth aspect of the invention, wherein the tilt detecting means compares the upper level of the absolute value of the envelope of the first difference signal with the upper level of the absolute value of the envelope of the second difference signal.

The eighth aspect of the invention corresponds to method (5) in the embodiments, and in particular, to the amplitude illustrated in FIGS. 22A, 22B and 22C.

The eighth aspect is the tilt detection device according to the sixth aspect of the invention, wherein the tilt detecting means compares the amplitude of the first difference signal with the amplitude of the second difference signal.

The ninth aspect of the invention corresponds to off-track detection in the embodiments.

The ninth aspect is the tilt detection device according to the present invention, further comprising: off-track detecting means for outputting an off-set amount representing the amount of displacement between the center of the track and the center of the light spot, by comparing a third summed signal representing the sum of the outputs from the first and second photo detecting elements when reflected light from the first shifted pits is received by the two-split photo detector, with a fourth summed signal representing the sum of the outputs from the first and second photo detecting elements when reflected light from the second shifted pits is received by the two-split detector, the off-set amount being added to the tracking control means.

The tenth aspect of the invention corresponds to the interval between shifted pits in the embodiments.

The tenth aspect is the tilt detection device according to the present invention, wherein the first shifted pits are provided in a repeated continuous fashion, and the second shifted pits are provided in a repeated continuous fashion, consecutively to the first shifted pits.

The eleventh aspect of the invention corresponds to a case where the interval between shifted pits is small (FIG. 8) in the embodiments.

The eleventh aspect is the tilt detection device according to the tenth aspect of the invention, wherein the space Ls representing the interval at which the first shifted pits are repeated is such that Lp<Ls<2Lp, where Lp is the pit length.

The twelfth aspect of the invention corresponds to a case where the interval between shifted pits is large (FIG. 9) in the embodiments.

The twelfth aspect is the tilt detection device according to the tenth aspect of the invention, wherein the space Ls representing the interval at which the first shifted pits are repeated is such that 20Lp<Ls, where Lp is the pit length.

The thirteenth aspect of the invention corresponds to method (3) in the embodiments.

The thirteenth aspect is a tilt detection device for detecting inclination of the recording surface of an optical disc having tracks formed in such a manner that they contain periodic wobbles, comprising:

an optical head for recording and reproducing signals by focusing a light spot onto said optical disc;

an photo detector for receiving reflected light from said optical disc;

tracking control means for controlling the position of said light spot on a track; and tilt detecting means for detecting inclination of the recording surface of an optical disc according to the amplitude of a wobble signal output when reflected light from the aforementioned wobbling track is received by the photo detector.

The fourteenth aspect of the invention corresponds to method (2) in the embodiments.

The fourteenth aspect is a tilt detection device for detecting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

an photo detector for receiving reflected light from said optical disc;

tracking control means for controlling the position of said light spot on a track; and tilt detecting means for detecting inclination of the recording surface of an optical disc according to the amplitude of a tracking error signal output when reflected light from a track is received by the photo detector, provided that said tracking control means is switched off and the light spot is traversing the tracks.

The fifteenth aspect of the invention corresponds to FIG. 10 in the embodiments.

According to the fifteenth aspect, in the tilt detection device according to the present invention, tilt detection and tilt quantity sampling are performed at the inner circumference region, the middle circumference region and the outer circumference region of the optical disc. Thereby, it is possible to detect the tilt angle accurately, regardless of the radial position on the optical disc, and hence signal quality during recording and reproduction can be improved.

The sixteenth aspect of the invention corresponds to FIG. 10 in the embodiments.

Correction of the quantity of tilt is carried out if the output of the tilt detecting means is at or above a prescribed value.

The seventeenth aspect of the invention corresponds to method (1) in the embodiments.

The seventeenth aspect is an optical disc device for detecting and correcting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photodetecting element and a second photo detecting element divided in a direction parallel to the track;

tracking control means for controlling the position of said light spot on a track;

tilt detecting means for detecting inclination of the recording surface of the optical disc with respect to the optical axis of said light beam by a difference signal output representing the difference between the signals from said first and second photo detecting elements when reflected light from said continuous track is received by the two-split photo detector; and tilt correcting means for controlling the angle of the optical disc according to the quantity of tilt detected by the tilt detecting means.

The eighteenth aspect of the invention corresponds to method (4) in the embodiments.

The eighteenth aspect is an optical disc device for detecting and correcting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on a track;

tilt detecting means for detecting inclination of the recording surface of the optical disc, by comparing a first summed signal representing the sum of the outputs from the first and second photo detecting elements when reflected light from said first shifted pits is received by the two-split photo detector, with a second summed signal representing the sum of the outputs from the first and second photo detecting elements when reflected light from said second shifted pits is received by the two-split photo detector; and tilt correcting means for controlling the angle of the optical disc according to the quantity of tilt detected by the tilt detecting means.

The nineteenth aspect of the invention corresponds to method (5) in the embodiments.

The nineteenth aspect is an optical disc device for detecting and correcting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on a track;

tilt detecting means for detecting inclination of the recording surface of the optical disc, by comparing a first difference signal representing the difference between the outputs from the first and second photo detecting elements when reflected light from said first shifted pits is received by the two-split photo detector, with a second difference signal representing the difference between the outputs from the first and second photo detecting elements when reflected light from said second shifted pits is received by the two-split photo detector; and tilt correcting means for controlling the angle of the optical disc according to the quantity of tilt detected by the tilt detecting means.

The twentieth aspect of the invention corresponds to method (3) in the embodiments.

The twentieth aspect is an optical disc device for detecting and correcting inclination of the recording surface of an optical disc having tracks formed in such a manner that they contain periodic wobbles, comprising:

an optical head for recording and reproducing signals by focusing a light spot onto said optical disc;

an photo detector for receiving reflected light from said optical disc;

tracking control means for controlling the position of said light spot on a track;

tilt detecting means for detecting inclination of the recording surface of an optical disc according to the amplitude of a wobble signal output when reflected light from the aforementioned wobbling track is received by the photo detector; and tilt correcting means for controlling the angle of the optical disc according to the quantity of tilt detected by the tilt detecting means.

The twenty-first aspect of the invention corresponds to method (2) in the embodiments.

The twenty-first aspect of the invention is an optical disc device for for detecting and correcting inclination of the recording surface of an optical disc having tracks and first shifted pits and second shifted pits formed such that the first shifted pits and the second shifted pits are displaced respectively to a first side and a second side of a track from the center of the track, comprising:

an optical head for recording and reproducing signals by focusing a light spot onto said optical disc;

an photo detector for receiving reflected light from said optical disc;

tracking control means for controlling the position of said light spot on a track;

tilt detecting means for detecting inclination of the recording surface of an optical disc according to the amplitude of a tracking error signal output when reflected light from a track is received by the photo detector, provided that said tracking control means is off and the light spot is traversing the tracks; and tilt correcting means for controlling the angle of the optical disc according to the quantity of tilt detected by the tilt detecting means.

The twenty-second aspect of the invention corresponds to method (1) in the embodiments.

The twenty-second aspect is a tilt detection method for detecting inclination of the recording surface of an optical disc having tracks and first shifted pits and second shifted pits formed such that the first shifted pits and the second shifted pits are displaced respectively to a first side and a second side of a track from the center of the track, comprising the steps of:

focusing a light spot onto said optical disc;

receiving light reflected from said optical disc by a photo detector including a first photo detecting element and a second photo detecting element divided in a direction parallel to the track;

performing tracking control for controlling the position of said light spot on a track; and detecting inclination of the recording surface of the optical disc with respect to the optical axis of said light beam by a difference signal output representing the difference between the signals from said first and second photo detecting elements when reflected light from said continuous track is received.

The twenty-third aspect of the invention corresponds to method (4) in the embodiments.

The twenty-third aspect is a tilt detection method for detecting inclination of the recording surface of an optical disc having tracks and first shifted pits and second shifted pits formed such that the first shifted pits and the second shifted pits are displaced respectively to a first side and a second side of a track from the center of the track, comprising the steps of:

focusing a light spot onto said optical disc;

receiving light reflected from said optical disc by a photo detector including a first photo detecting element and a second photo detecting element divided in a direction parallel to the track;

performing tracking control for controlling the position of said light spot on a track; and detecting inclination of the recording surface of the optical disc, by comparing a first summed signal representing the sum of the outputs from the first and second photo detecting elements when reflected light from said first shifted pits is received, with a second summed signal representing the sum of the outputs from the first and second photo detecting elements when reflected light from said second shifted pits is received.

The twenty-fourth aspect of the invention corresponds to method (5) in the embodiments.

The twenty-fourth aspect is a tilt detection method for detecting inclination of the recording surface of an optical disc having tracks and first shifted pits and second shifted pits formed such that the first shifted pits and the second shifted pits are displaced respectively to a first side and a second side of a track from the center of the track, comprising the steps of:

focusing a light spot onto said optical disc;

receiving light reflected from said optical disc by a photo detector including a first photo detecting element and a second photo detecting element divided in a direction parallel to the track;

performing tracking control for controlling the position of said light spot on a track; and detecting inclination of the recording surface of the optical disc, by comparing a first difference signal representing the difference between the outputs from the first and second photo detecting elements when reflected light from said first shifted pits is received, with a second difference signal representing the difference between the outputs from the first and second photo detecting elements when reflected light from said second shifted pits is received.

The twenty-fifth aspect of the invention corresponds to method (3) in the embodiments.

The twenty-fifth aspect is a tilt detection method for detecting inclination of the recording surface of an optical disc having tracks formed in such a manner that they contain periodic wobbles, comprising the steps of:

focusing a light spot onto said optical disc;

receiving reflected light from said optical disc;

performing tracking control for controlling the position of said light spot on a track; and detecting inclination of the recording surface of an optical disc according to the amplitude of a wobble signal output when reflected light from the aforementioned wobbling track is received by the photo detector.

The twenty-sixth aspect of the invention corresponds to method (2) in the embodiments.

The twenty-sixth aspect is a tilt detection method for detecting inclination of the recording surface of an optical disc having tracks and first shifted pits and second shifted pits formed such that the first shifted pits and the second shifted pits are displaced respectively to a first side and a second side of a track from the center of the track, comprising the steps of:

focusing a light spot onto said optical disc;

receiving reflected light from said optical disc;

performing tracking control for controlling the position of said light spot on a track; and detecting inclination of the recording surface of an optical disc according to the amplitude of a tracking error signal output when reflected light from a track is received, provided that said tracking control means is switched off and the light spot is traversing the tracks.

The twenty-seventh aspect of the invention corresponds to FIG. 26 and FIGS. 27A, 27B, 27C and 27D in the embodiments.

The twenty-seventh aspect is a tilt detection device relating to the present invention further comprises off-track detecting means representing the off-set amount for the tracking control, by comparing the phases of the output values corresponding to the first and second shifted pits from diagonal sum signal outputs from a four-split photo detector, when reflected light from the first and second shifted pits is received by the four-split photo detector, the off-set amount being added to the tracking control means.

The twenty-eighth aspect of the invention corresponds to FIG. 26 and FIGS. 27A, 27B, 27C and 27D in the embodiments.

The twenty-eighth aspect is an optical disc device comprising:

an optical head for recording and reproducing signals by focusing a light spot onto an optical disc having tracks;

focus control means for controlling the focal position of said light spot on the surface of the optical disc;

tracking control means for controlling the position of said light spot on a track;

a four-split photo detector for receiving reflected light from said optical disc, said photo detector having four light-receiving surfaces divided by orthogonal dividing lines;

a calculating circuit for generating:
  a focus error signal generated from the output of said four-split photo detector;
  a tracking error signal generated from the output of said four-split photo detector;
  a total sum signal generated from the output of said four-split photo detector; and
  an off-track detection signal generated from two diagonal sum signals, each representing the summed outputs of two diagonally opposed photo detecting elements in said four-split photo detector;

off-track detecting means for detecting the amount of off-track from the off-track detection signal generated by said calculating circuit; and off-track controlling means for correcting the off-track position of said light spot from the detection value detected by said off-track detecting means.

The twenty-ninth aspect of the invention corresponds to FIG. 26 and FIGS. 27A, 27B, 27C and 27D in the embodiments.

The twenty-ninth aspect of the invention is the optical disc device according to the twenty-eighth aspect of the invention, wherein the detection value detected by the off-track detecting means is detected from a reproduction signal reproduced by said optical head while passing first shifted pits and second shifted pits, said first shifted pits and the second shifted pits being displaced respectively to a first side and a second side of a track from the center of the track.

The thirtieth aspect of the invention corresponds to FIG. 26 and FIGS. 27A, 27B, 27C and 27D in the embodiments.

The thirtieth aspect is an off-track detection method for an optical disc, comprising the steps of:

recording and reproducing signals by focusing a light spot onto an optical disc having tracks, controlling focus for controlling the focal position of said light spot on the surface of the optical disc;

performing tracking control for controlling the position of said light spot on a track;

receiving reflected light from said optical disc by a four-split photo detector, said photo detector having four light-receiving surfaces divided by orthogonal dividing lines;

performing calculations in order to generate:
  a focus error signal generated from the output of said four-split photo detector;
  a tracking error signal generated from the output of said four-split photo detector;
  a total sum signal generated from the output of said four-split photo detector; and
  an off-track detection signal generated from two diagonal sum signals, each representing the summed outputs of two diagonally opposed photo detecting elements in said four-split photo detector;

detecting the amount of off-track from the off-track detection signal generated by said calculating step; and controlling off-track for correcting the off-track position of said light spot from the detection value detected by said off-track detecting step.

The thirty-first aspect of the invention corresponds to FIG. 26 and FIGS. 27A, 27B, 27C and 27D in the embodiments.

The thirty-first aspect of the invention is the optical disc device according to the thirtieth aspect of the invention, wherein the detection value detected by said off-track detection step is detected from a reproduction signal reproduced by said optical head while passing first shifted pits and second shifted pits, said first shifted pits and the second shifted pits being displaced respectively to a first side and a second side of a track from the center of the track.

BRIEF DESCRIPTION OF THE DRAWINGS

FIGS. 18A, 18B and 18C are diagrams describing the relationship between R tilt and a push-pull TE signal in a first embodiment of the present invention;

FIGS. 19A, 19B and 19C are diagrams describing the relationship between R tilt and the amplitude of a push-pull TE signal in a first embodiment of the present invention;

FIGS. 20A, 20B and 20C are diagrams describing the relationship between R tilt and the amplitude of a wobble signal in a first embodiment of the present invention;

FIGS. 21A, 21B and 21C are diagrams describing the relationship between R tilt and the summed signal output from the repeated continuous pit sequences in a first embodiment of the present invention;

FIGS. 22A, 22B and 22C are diagrams describing the relationship between R tilt and the difference signal output from repeated continuous pit sequences in a first embodiment of the present invention;

FIG. 23 is a diagram for describing difference signal output in a first embodiment of the present invention;

FIG. 24 is a compositional diagram of an optical disc according to a first embodiment of the present invention;

FIGS. 25A, 25B and 25C are diagrams describing the relationship between off-track and the summed signal output from repeated continuous pit sequences in a first embodiment of the present invention;

FIG. 26 is a diagram for describing an off-track detection method according to a first embodiment of the present invention;

FIGS. 27A, 27B, 27C and 27D are diagrams describing phase difference signals according to a first embodiment of the present invention;

FIG. 29 is a diagram showing simulation results for off-track error with respect to R tilt in a first embodiment of the present invention.

DESCRIPTION OF THE PREFERRED EMBODIMENTS

Figure 1:
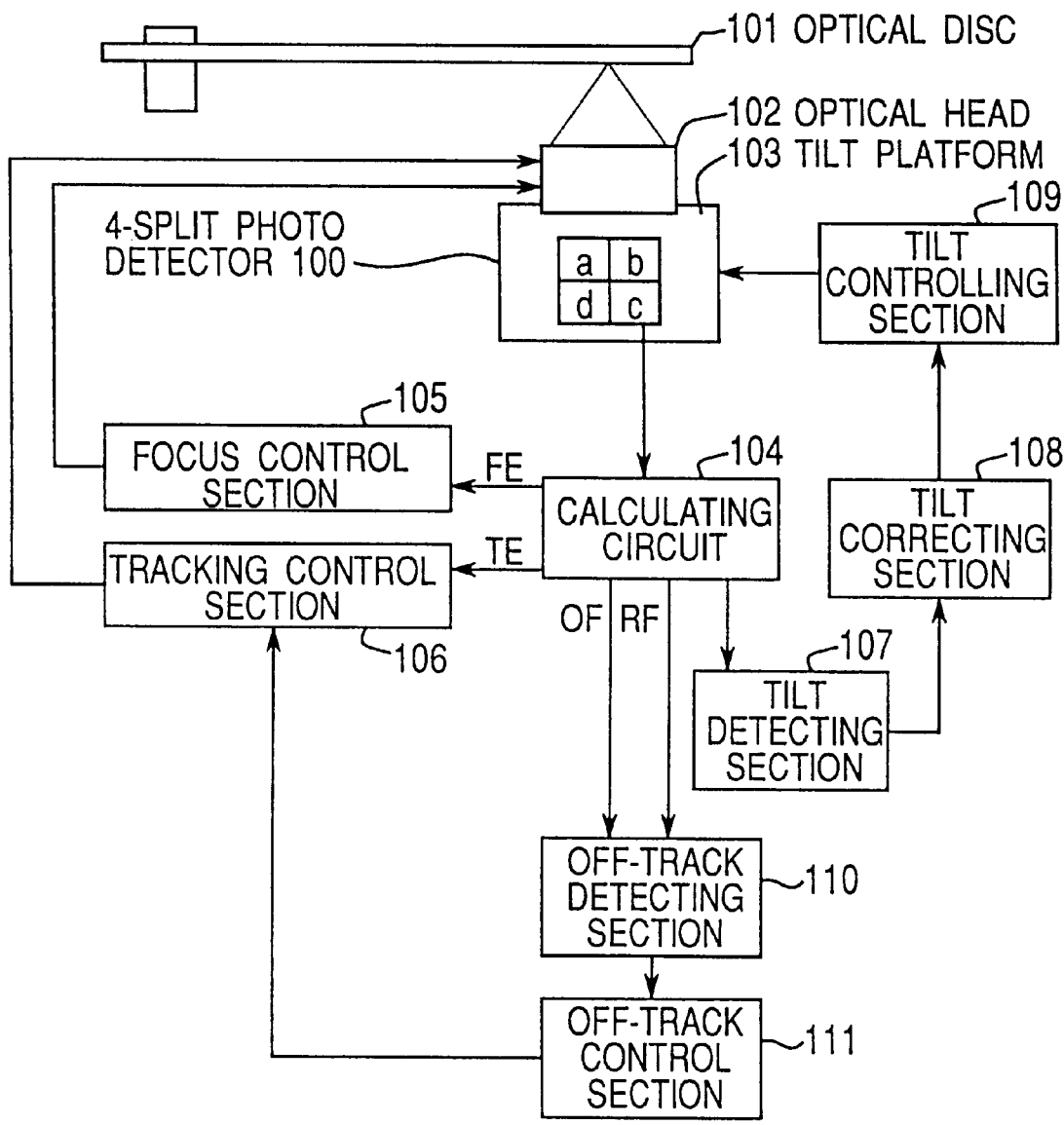
FIG. 1 is a compositional diagram of an optical disc device according to a first embodiment of the present invention.
Figure 2:
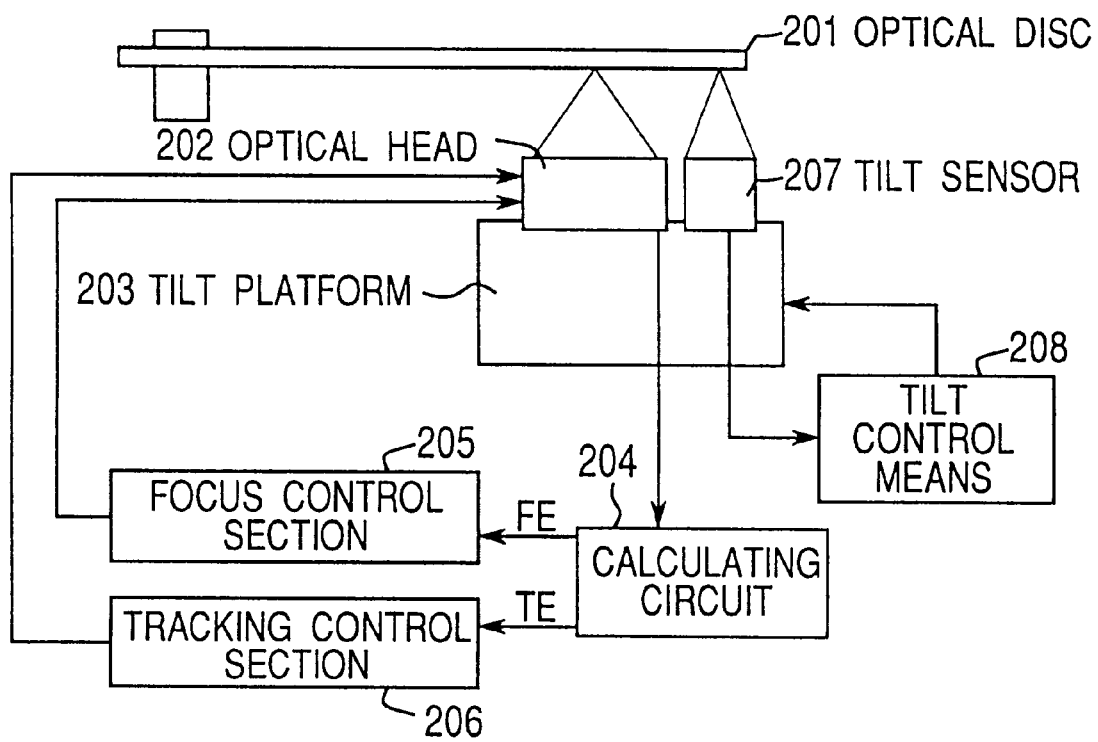
FIG. 2 is a compositional diagram of a conventional optical disc device.
Figure 3:
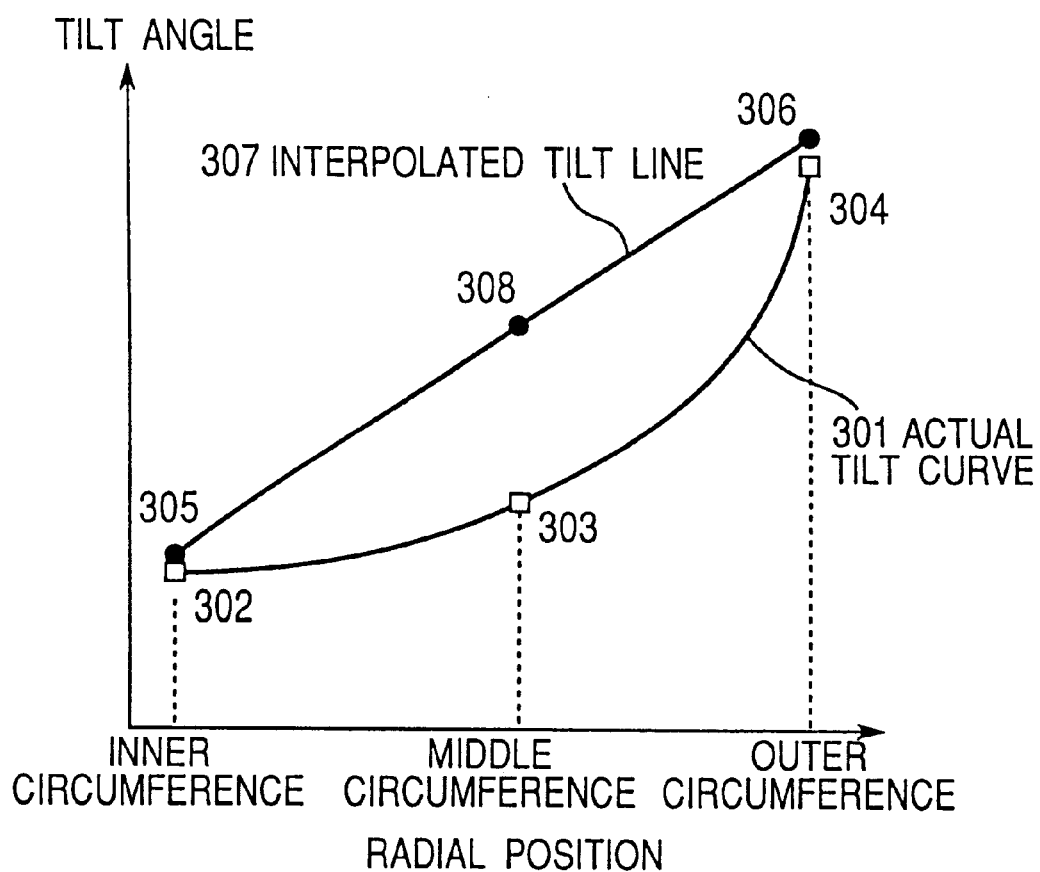
FIG. 3 is a diagram illustrating a conventional tilt correction method for an optical disc.

Below, a first embodiment of the present invention is described with reference to the drawings. FIG. 1 is a compositional diagram of an optical disc device in the present embodiment.

In FIG. 1, 101 is an optical disc, 102 is an optical head which focuses a light beam onto the optical disc, 100 is a four-split photo, 103 is a tilt platform, 104 is a signal calculating circuit, 105 denotes a focus control section for controlling the focal position of the light spot on the optical disc surface, 106 denotes a tracking control section for controlling the position of the optical spot on the track, the recording surface of the optical disc with respect to the optical axis of, and 108 denotes a tilt correcting section for controlling the inclination of the recording surface of the aforementioned optical disc with respect to the optical axis of the aforementioned light beam, by inclining the aforementioned tilt platform, 110 is an off-track detecting section and 111 is an off-track control section. If a and d in the four-split photo detector are regarded as an integral unit and b and c are similarly regarded as an integral unit, then the photo detector can be seen as a two-split photo detector divided into two parts parallel to the track direction.

Next, recording and reproduction operations are described.

A light spot directed onto the optical disc 101 by the optical head 102 is focused on the optical disc 101 by the focus control section 105, and the light spot is tracked to a desired track position at a desired radial position of the optical disc 101 by the tracking control section 106. Data stored on the optical disc is read out by reproducing the undulating pits on the optical disc, or in the case of a phase change-type optical disc, the denser and lighter marks having different rates of reflectance, by the light spot focused and tracked in the foregoing manner.

Figure 4:
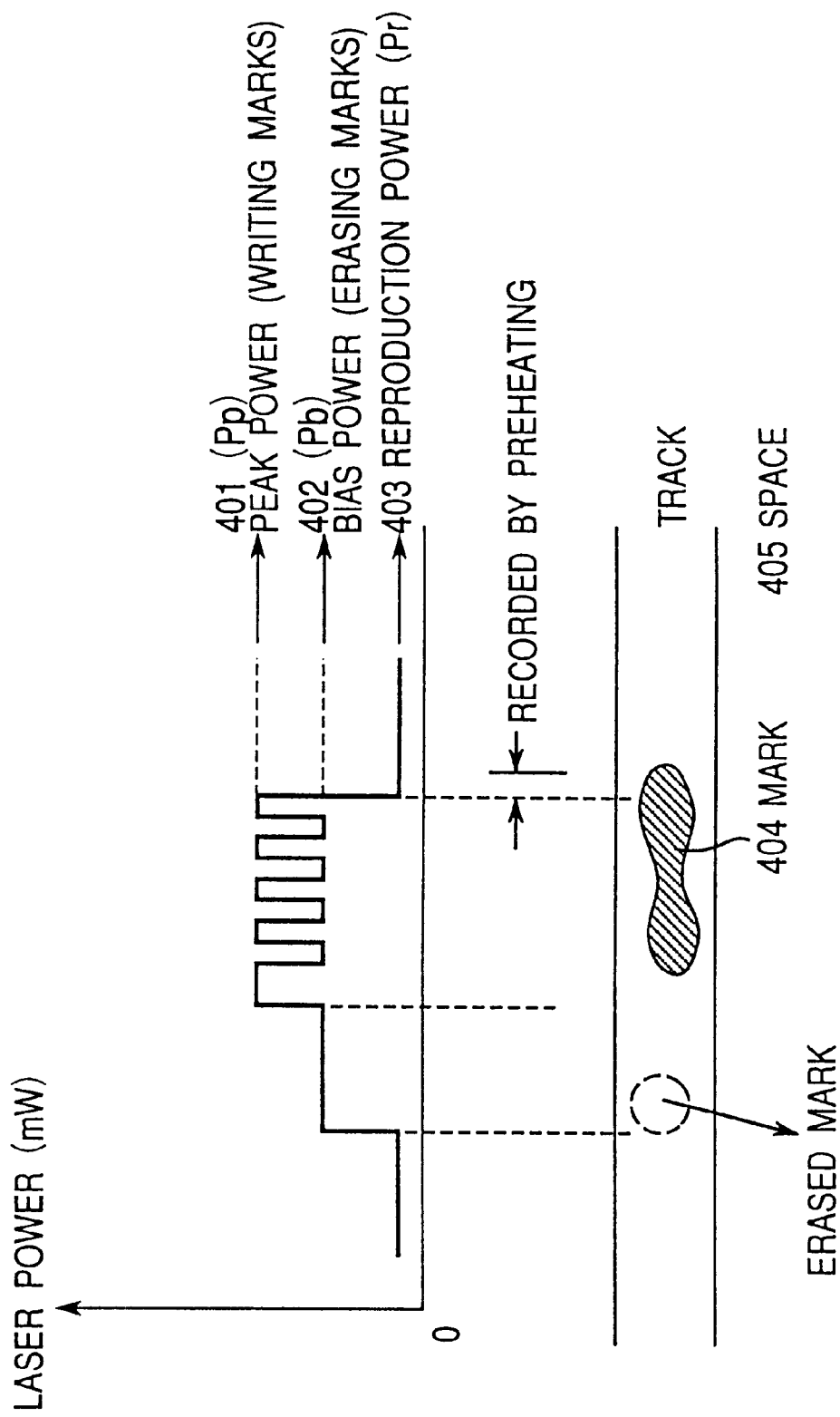
FIG. 4 is a diagram for describing recording and reproduction in an optical disc device according to a first embodiment of the present invention.

A recording operation is now described with reference to FIG. 4.

In a phase change-type optical disc, marks (amorphous sections) 404 and spaces 405 (crystalline sections) located between these marks are formed on a optical disc medium by irradiating a semiconductor laser onto an optical disc medium at two powers: a peak power 401 for rendering crystalline regions amorphous, and a bias power 402 for crystallizing amorphous regions.

Since the marks and spaces have different reflectance, during reproduction, the stored signal is read out by reading these differences in reflectance using a reproduction power 403 which is of lower power than the aforementioned peak power 401 or bias power 402.

Next, tilt is described with reference to FIG. 5.

Figure 5:
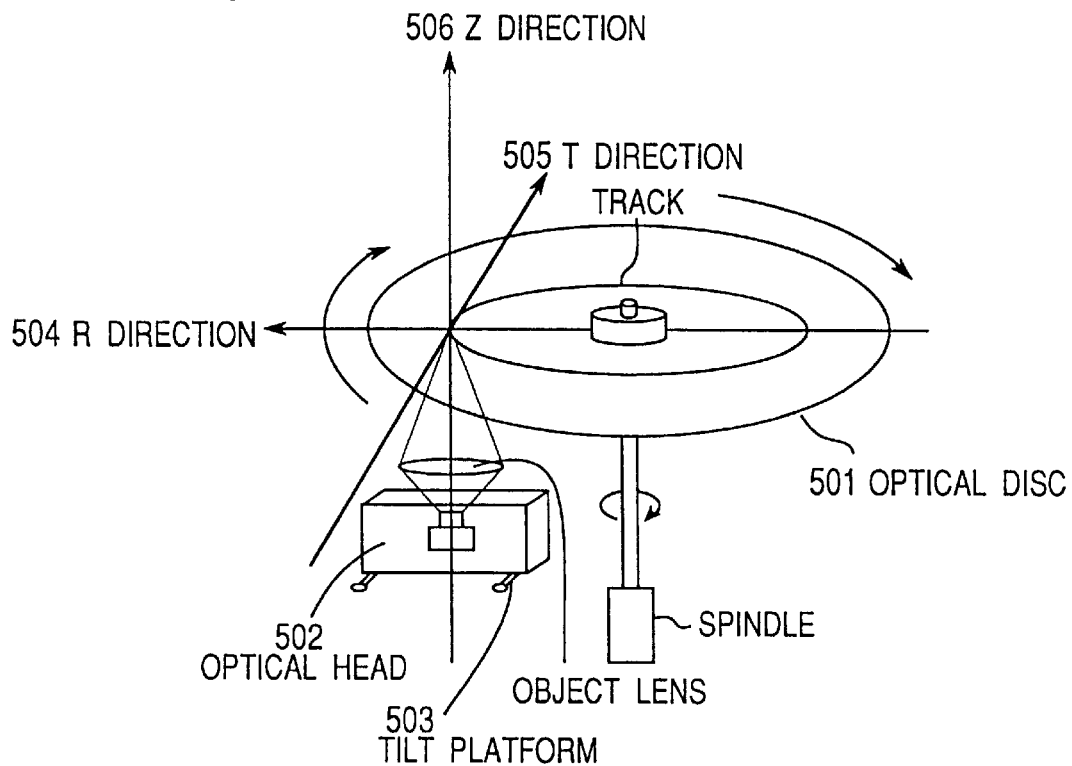
FIG. 5 is a compositional diagram of an optical disc device according to a first embodiment of the present invention.

As shown in FIG. 5, the line linking the center of the optical disc 501 and the light spot focused onto the optical disc 501 from the optical head 502 is called the radial direction 504, and the direction perpendicular to the aforementioned radial direction 504 in the plane of the optical disc 501 is called the tangential direction 505. The direction perpendicular to the plane of the optical disc 501 is called the z-axis direction 506.

When distinguished by direction, tilt comprises radial direction tilt in an orthogonal direction to the track and tangential direction tilt in a parallel direction to the track.

Radial tilt (R tilt) is now described with reference to FIG. 6.

Figure 6:
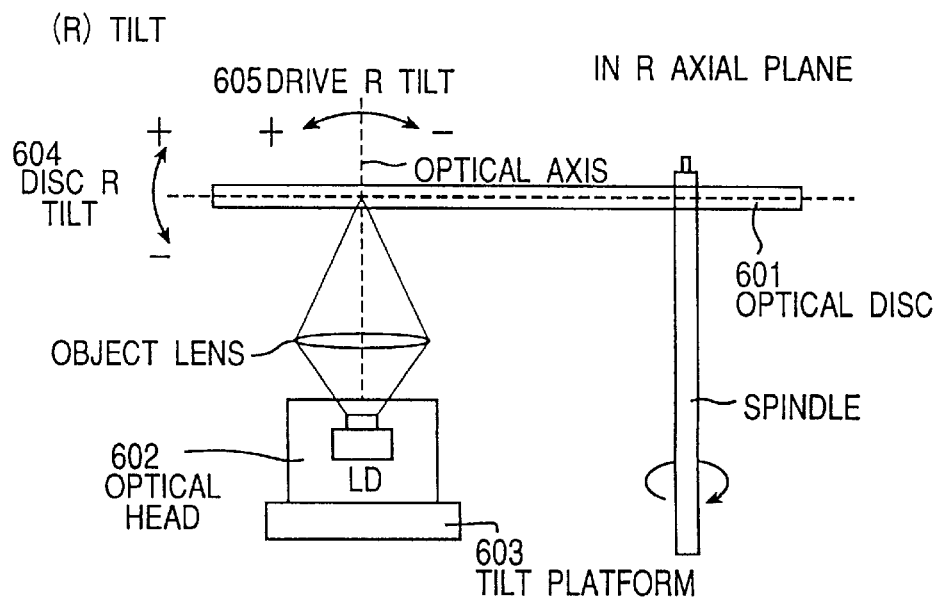
FIG. 6 is a diagram for describing R tilt in an optical disc device according to a first embodiment of the present invention.

In FIG. 6, 601 is an optical disc, 602 is an optical head and 603 is a tilt platform. Radial tilt (R tilt) comprises disc R tilt 604 which is generated by warping of the disc, or surface irregularities caused by rotation of the disc, and drive R tilt 605 based on the inclination of the recording surface of the optical disc 601 with respect to the optical axis of the light beam, which is caused by incorrect installation of the optical head or inclination of the tilt platform. Essentially, disc R tilt and drive R tilt are commonly called R tilt, without distinction.

Tangential tilt (T tilt) is now described with reference to FIG. 7.

Figure 7:
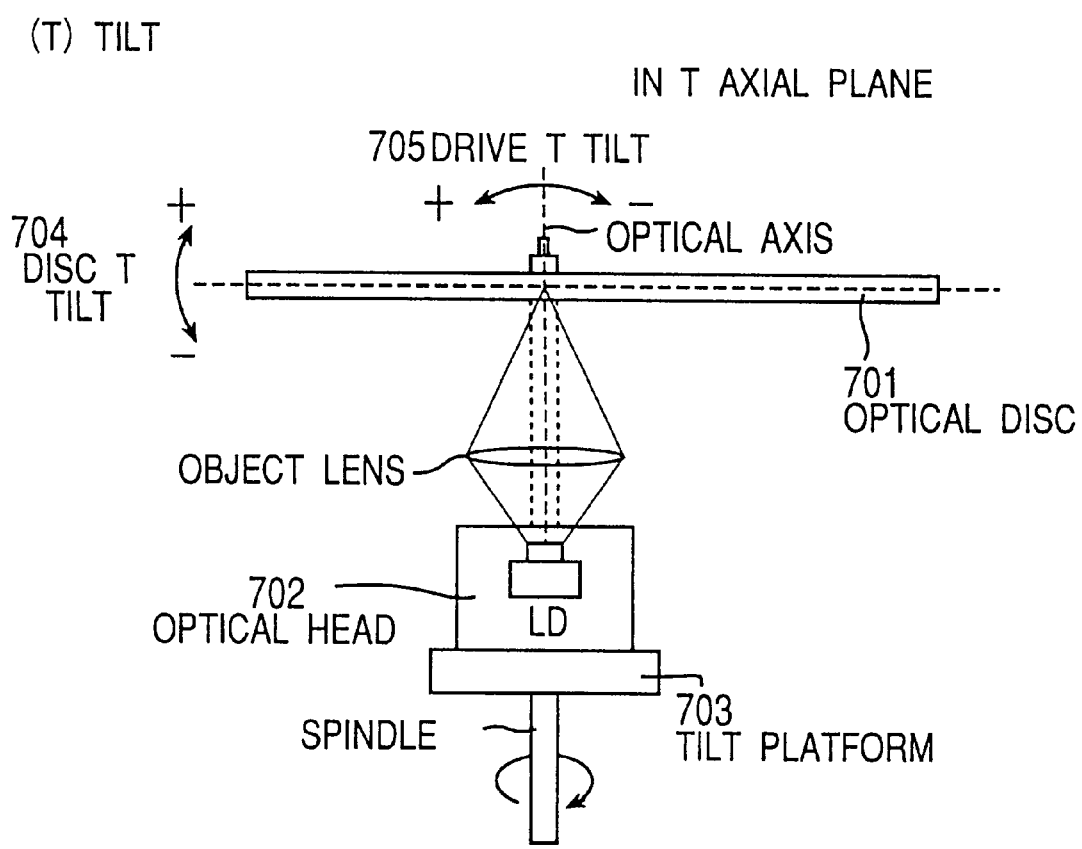
FIG. 7 is a diagram for describing T tilt in an optical disc device according to a first embodiment of the present invention.

In FIG. 7, 701 is an optical disc, 702 is an optical head and 703 is a tilt platform. Tangential tilt (T tilt) comprises disc T tilt 704 which is generated by fluctuations in disc rotation, surface precision errors in the disc, and the like, and drive T tilt 705 based on the inclination of the recording surface of the optical disc 701 with respect to the optical axis of the light beam, which is caused by incorrect installation of the optical head or inclination of the tilt platform. Essentially, disc T tilt and drive T tilt are commonly called T tilt, without distinction.

Next, a method for detecting R tilt is described. The signals detected by the tilt detecting section 107 in FIG. 1 are as follows.

(1) A method whereby, in a tracking on state, in other words, a state where the optical beam is operating along the track, the voltage of a difference signal (push-pull TE) is detected from a two-split photo detector which receives light diffracted by a guide groove formed previously in the optical disc.

(2) A method whereby, in a tracking off state, in other words, a state where the optical beam is operating in a lateral direction to the tracks, the amplitude of a difference signal (push-pull TE) is detected from a two-split photo detector which receives light diffracted by a guide groove formed previously in the optical disc.

(3) A method whereby, in a tracking on state, the amplitude of a "wobble" signal is detected from a guide groove previously formed in the optical disc such that it contains periodic deviations ("wobbles").

(4) A method whereby, in a tracking on state, the amplitude, or the lower signal level (lower envelope) or the upper signal level (upper envelope) are compared in the first half and the second half of a reproduction signal output as the summed signal of a two-split photo detector, when continuous zigzag-shaped pits previously formed in the optical disc are reproduced.

(5) A method whereby, in a tracking on state, the amplitude or the upper signal level (upper envelope) are compared in the first half and the second half of a reproduction signal output as the difference signal of a two-split photo detector, when continuous zigzag-shaped pits previously formed in the optical disc are reproduced.

(6) A method whereby, in a tracking on state, the amplitude or the lower signal level (lower envelope) are compared in the first half and the second half of a reproduction signal output as the sum signal of a two-split photo detector, when isolated zigzag-shaped pits previously formed in the optical disc are reproduced.

In (1), (3), (4), (5) and (6) of the foregoing methods, control is implemented in a tracking on state. Even if R tilt or T tilt occurs, it is possible to position the light spot in the center of the track by the off-track detecting section 110 and the off-track control section 111. Therefore, in methods (1), (3), (4), (5), (6), firstly, it is possible to position the light spot in the center of the track by the off-track detecting section 110 and the off-track control section 111. In this state, the light spot is divided in two along the center thereof (center of circular region) by a line parallel to the track direction, and quantity of light in the respective divided regions is examined. If the quantities of light in the two divided regions are equal, then there is no tilt, whilst if there is a difference between these quantities, then tilt is present.

In the description of methods (1), (3), (4), (5), (6) below, it is explained how the light spot is positioned in the center of the track by the off-track detecting section 110 and the off-track control section 111. The off-track detecting section 110 and the off-track control section 111 are described in detail later with reference to FIG. 24 to FIG. 29.

Firstly, a description is given of method (1) for detecting the difference signal (push-pull TE) from a two-split photo detector receiving light from a light spot diffracted by a guide groove formed previously in the optical disc.

FIGS. 18A, 18B and 18C each shows a sectional view of a guide groove on an optical disc and a reproduction signal waveform relating to same. 1801 is a groove track and 1802 is a land track.

The example in FIGS. 18A–18C shows a state where tracking on control is implemented and off-track control is implemented, in other words, a state where the light spot is controlled in such a manner that it operates along the center of the track. The waveform diagram in FIGS. 18A–18C shows the difference signal output (push-pull TE signal) from a two-split photo detector during signal reproduction. In the reproduction signal waveform, the push-pull TE signal assumes a reference level 1803 when the R tilt is 0° (FIG. 18B). If an R tilt of −0.40 (FIG. 18C) occurs, then an aberration is generated in the light spot, due to the R tilt. In this case, a phase shift occurs in the push-pull TE signal, and an offset of +G is generated in the reproduction signal of the push-pull TE signal, from the reference level where the R tilt is 0° . If an R tilt of −0.4° occurs (FIG. 18A), then an aberration is generated in the light spot, due to the R tilt. In this case, a phase shift occurs in the push-pull TE signal, and an offset of −G is generated in the reproduction signal of the push-pull TE signal, from the reference level where the R tilt is 0°. The offset G in the push-pull TE signal from the reference level differs when the R tilt is +0.40 and when the R tilt is −0.40. The tilt detecting section saves the offset G as the detection value for the tilt detecting section.

The tilt control section takes this tilt detection value as the tilt angle and corrects the tilt angle.

Figure 11:
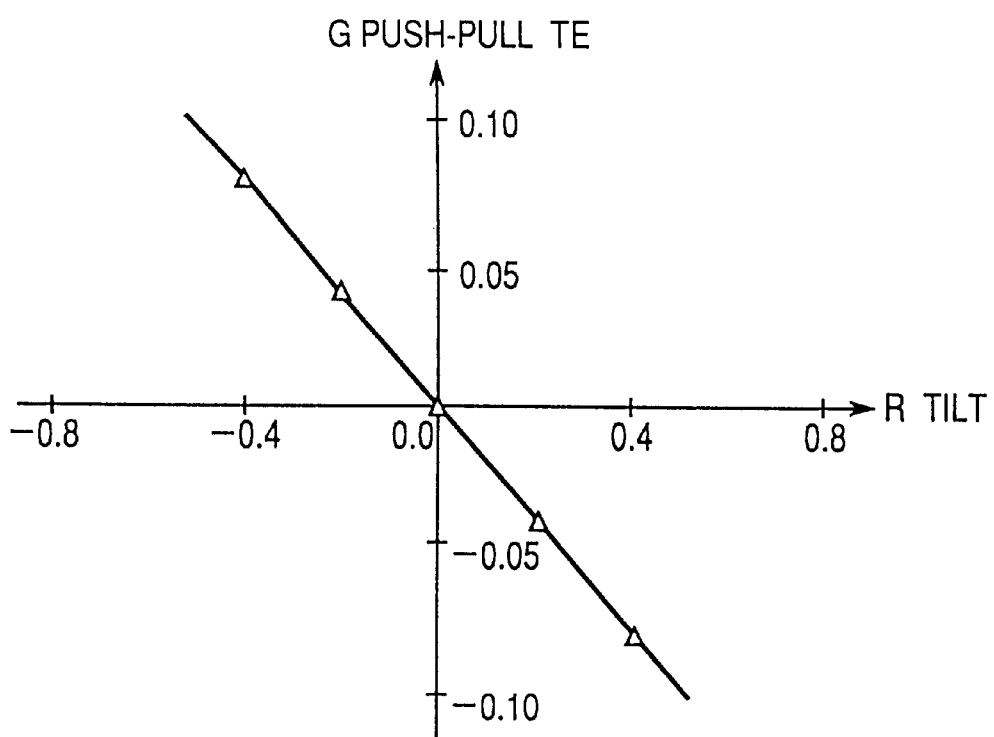
FIG. 11 is a graph for describing the relationship between R tilt and a push-pull TE signal in a first embodiment of the present invention.

FIG. 11 shows simulation results for the relationship between the amount of R tilt in a state where R tilt occurs and the detection value G detected by the tilt detecting section. The optical conditions used in the simulation are: wavelength=650 nm, NA=0.6, radial direction RIM intensity=0.25, tangential direction RIM intensity=0.83. Furthermore, these results relate to a case where the light spot tracks along the center of the track. In FIG. 11, if no R tilt occurs, then the offset G in the push-pull TE signal is 0. If R tilt does occur, then there will be an aberration in the light spot, the light diffracted from the guide groove will not form a true circle, and a bump-shaped primary light spot will be formed to the side of the light spot. If the R tilt angle is in the +direction (see FIG. 6), then a +1 light spot is generated to the right-hand side of the circle (see FIG. 18C), and if the R tilt angle is in the - direction, then a -1 light spot is generated to the left-hand side of the circle (see FIG. 18A). If the R tilt is +0.40 or 0.40, a disparity occurs in the output (push-pull TE signal) of the difference signal produced when the two-split photo detector receives diffracted light from the guide groove. The graphs in FIG. 11 plot the value of the offset G in the push-pull signal.

The tilt detecting section detects the tilt angle by taking the offset G of the aforementioned push-pull TE signal as the tilt angle detection value.

For example, if the offset G of the push-pull TE signal, which is the detection value detected by the tilt detecting section 107, is −0.08, then from FIG. 11, the R tilt is +0.40, and hence the tilt correcting section 108 transmits a tilt correction value corresponding to this detection value to the tilt controlling section 109, and the R tilt angle is corrected by the tilt controlling section 109 driving the tilt platform 103.

The application of this R tilt detection method is not limited to the optical conditions used in this simulation.

The tilt detection value has a standard value of 1 when 100% of the light is reflected back by the mirror section in the two-split photo detector.

Next, a description is given of method (2) for detecting the amplitude of a difference signal (push-pull TE) from a two-split photo detector receiving light from a light spot diffracted by a guide groove formed previously in the optical disc.

Here, since the device is in a tracking off state, the light spot is operated such that it traverses the tracks laterally. FIGS. 19A, 19B, 19C each shows a sectional view of a guide groove on an optical disc and a reproduction signal waveform relating to same. 1901 is a light spot, 1902 is a track center, which is the center of the guide groove, and 1903 is a guide groove previously formed in the optical disc.

In this example, a difference signal output (in this case, a push-pull TE signal) is reproduced by a two-split photo detector when tracking is off.

In the reproduction signal waveform, the amplitude K of the push-pull TE signal is large when the R tilt is 0°. If an R tilt of 0.4° occurs, then an aberration is generated in the light spot, due to the R tilt. In this case, the amplitude K of the push-pull TE signal declines due to the effects of light diffraction. If an R tilt of −0.4° occurs, then an aberration is generated in the light spot, due to the R tilt. In this case also, the amplitude K of the push-pull TE signal declines due to the effects of light diffraction. The amplitude K of the push-pull TE signal when the R tilt is +0.4° or when the R tilt is −0.4° differs from the amplitude K, which will be the peak value, when the R tilt is 0°. The tilt detecting section saves the amplitude K of the push-pull TE signal as the detection value of the tilt detecting section.

The tilt control section takes this tilt detection value as the tilt angle and corrects the tilt angle.

Figure 12:
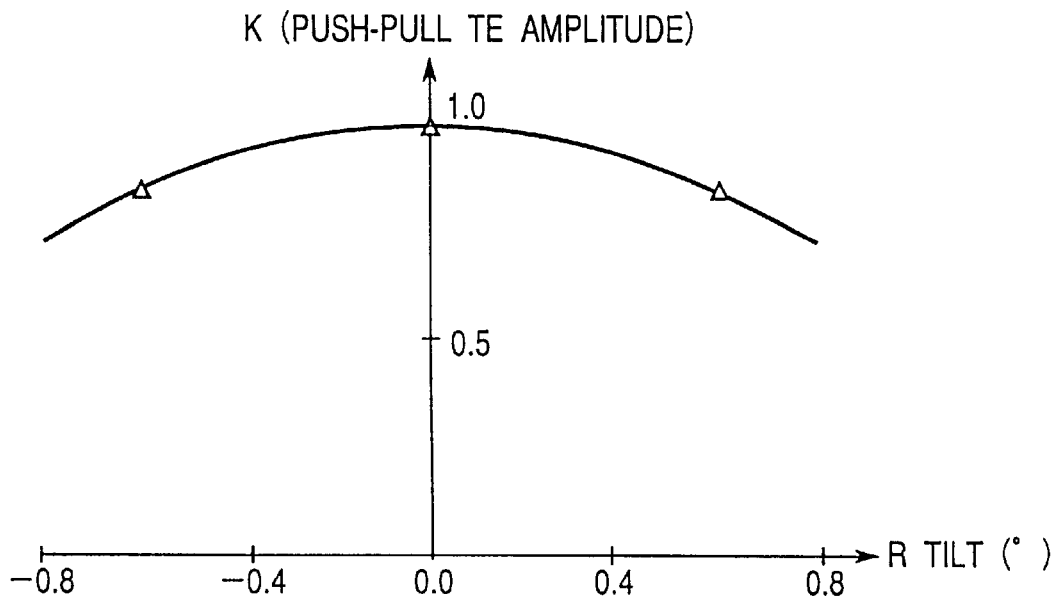
FIG. 12 is a graph for describing the relationship between R tilt and the amplitude of a push-pull TE signal in a first embodiment of the present invention.

FIG. 12 shows simulation results for the relationship between the amount of R tilt in a state where R tilt occurs and the detection value K detected by the tilt detecting section. The optical conditions used in the simulation are: 650 nm wavelength, NA=0.6, radial direction RIM intensity=0.25, tangential direction RIM intensity=0.83. Furthermore, these results relate to a case where the light spot tracks along the center of the track. In FIG. 12, if no R tilt occurs, then the amplitude of the push-pull TE signal is 1.0. If R tilt occurs, an aberration arises in the light spot, and if the diffracted light from the guide groove contains R tilt of +0.4° or R tilt of −0.4°, then a disparity arises in the output (push-pull TE signal) of the difference signal produced when the two-split photo detector receives diffracted light from the guide groove.

The graphs in FIG. 12 plot the amplitude K of the push-pull TE signal.

The tilt detecting section detects the tilt angle by taking the amplitude K of the aforementioned push-pull TE signal as the tilt angle detection value.

For example, if the amplitude K of the push-pull TE signal, which is the detection value detected by the tilt detecting section 107, is 0.8, then from FIG. 12, the R tilt is +0.4° or −0.4°, and hence the tilt correcting section 108 transmits a tilt correction value corresponding to this detection value to the tilt controlling section 109, and the R tilt angle is corrected by the tilt controlling section 109 driving the tilt platform 103.

The application of this R tilt detection method is not limited to the optical conditions used in this simulation.

The tilt detection value has a standard value of 1 when 100% of the light is reflected back by the mirror section in the two-split photo detector.

Next, a description is given of method (3) for detecting the amplitude of a difference signal (wobble signal) from a two-split photo detector receiving light from a light spot diffracted by a guide groove formed previously in the optical disc such that it contains periodic deviations ("wobbles").

FIGS. 20A, 20B and 20C each show a view of the configuration of a guide groove on an optical disc and a reproduction signal waveform relating to same. 2001 is a light spot, 2002 is a track center, which is the center of the guide groove, and 2003 is a guide groove previously formed such that it contains "wobbles".

Here, since the device is in a tracking on state, the light spot operates along the center of the track. FIGS. 20A–20C show difference signal outputs (in this case, wobble signals,) from a two-split photo detector during reproduction.

In the reproduced signal waveform, the amplitude H of the wobble signal is a maximum when the R tilt is 0°. If an R tilt of 0.4° occurs, then an aberration is generated in the light spot, due to the R tilt. In this case, the amplitude H of the wobble signal declines due to the effects of light diffraction. If an R tilt of −0.4° occurs, then an aberration is generated in the light spot, due to the R tilt. In this case, the amplitude H of the wobble signal declines due to the effects of light diffraction. The amplitude H of the wobble signal when the R tilt is +0.4° or when the R tilt is −0.4° differs from the amplitude H when the R tilt is 0°. The tilt detecting section saves the amplitude H of the wobble signal as the detection value of the tilt detecting section.

The tilt control section takes this tilt detection value as the tilt angle and corrects the tilt angle.

Figure 13:
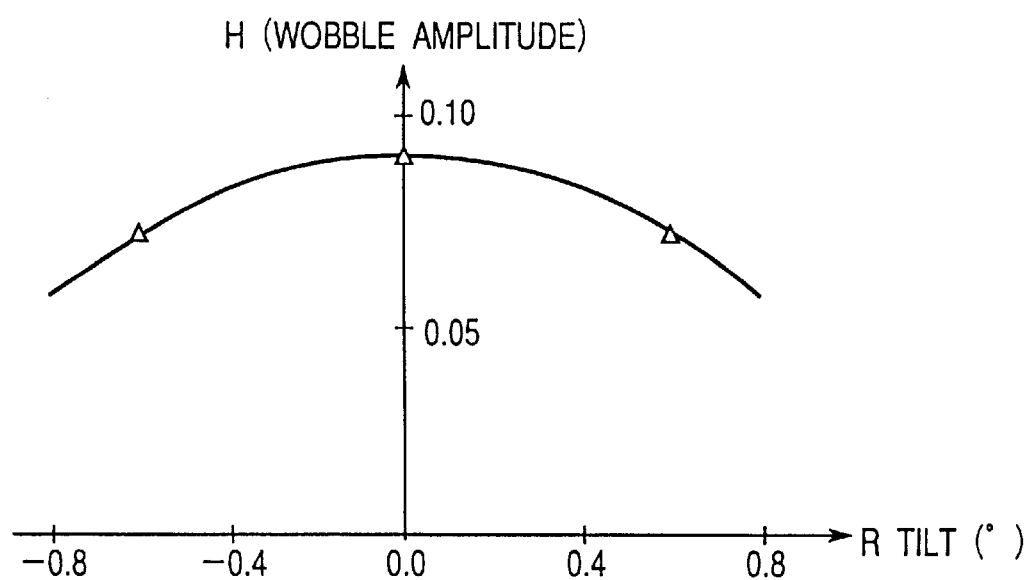
FIG. 13 is a graph for describing the relationship between R tilt and the amplitude of a wobble signal in a first embodiment of the present invention.

FIG. 13 shows simulation results for the relationship between the amount of R tilt in a state where R tilt occurs and the detection value H detected by the tilt detecting section. The optical conditions used in the simulation are: wavelength=650 nm, NA=0.6, radial direction RIM intensity=0.25, tangential direction RIM intensity=0.83. Furthermore, these results relate to a case where the light spot tracks along the center of the track. If no R tilt occurs in FIG. 13, then the amplitude H of the wobble signal is 0.09. If R tilt occurs, an aberration arises in the light spot, and if the diffracted light from the guide groove contains R tilt of +0.4° or R tilt of −0.4°, then a disparity arises in the output of the difference signal (wobble signal) produced when the two-split photo detector receives diffracted light from the guide groove. The graphs in FIG. 13 plot the amplitude H of the wobble signal.

The tilt detecting section detects the tilt angle by taking the amplitude H of the wobble signal as the detection value for the tilt angle.

For example, if the amplitude H of the wobble signal, which is the detection value detected by the tilt detecting section 107, is 0.083, then from FIG. 13, the R tilt is +0.4° or −0.4°, and hence the tilt correcting section 108 transmits a tilt correction value corresponding to this detection value to the tilt controlling section 109, and the R tilt angle is corrected by the tilt controlling section 109 driving the tilt platform 103.

The application of this R tilt detection method is not limited to the optical conditions used in this simulation.

The tilt detection value has a standard value of 1 when 100% of the light is reflected back by the mirror section in the two-split photo detector.

Next, a description is given of method (4) whereby the tilt angle is detected by comparing the lower signal level in the first half and the second half of a reproduction signal output as the summed signal of a two-split photo detector, when continuous zigzag-shaped pits previously formed in the optical disc are reproduced.

Figure 8:
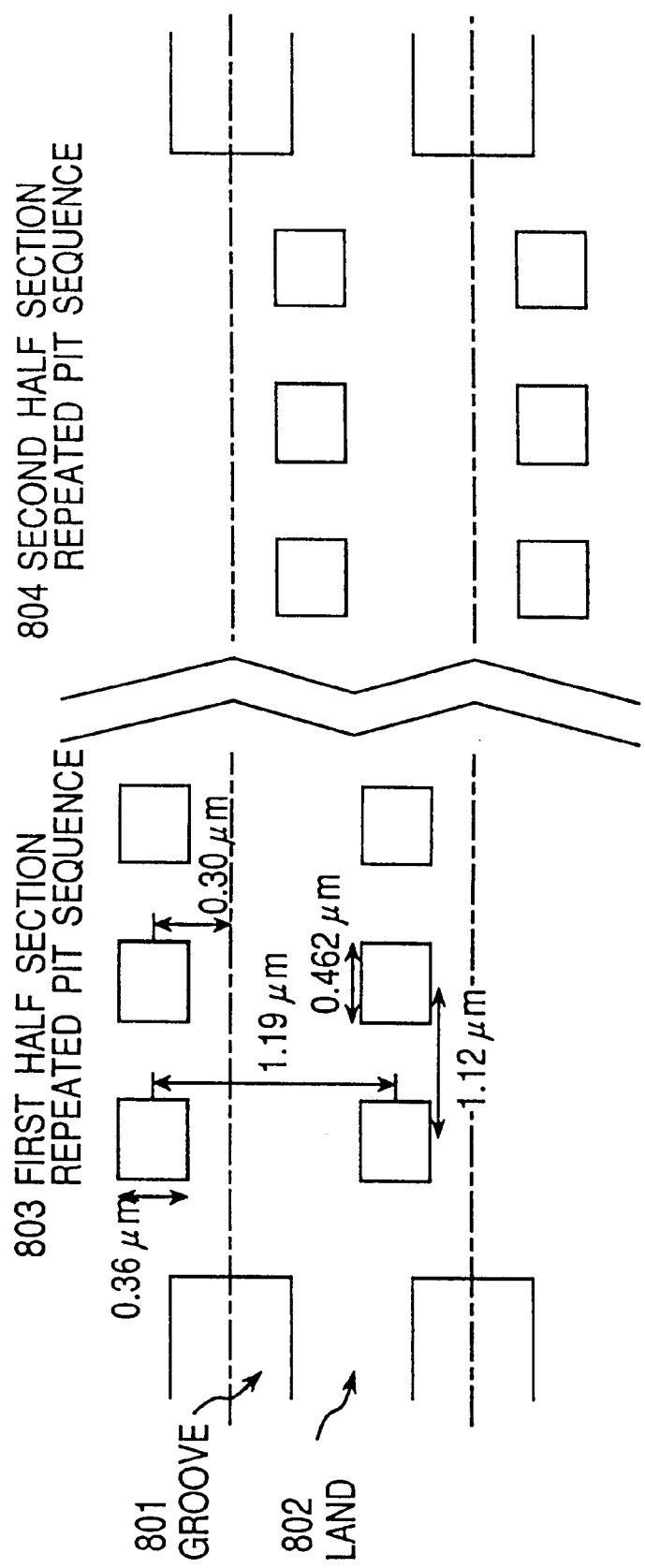
FIG. 8 is a compositional diagram of an optical disc according to a first embodiment of the present invention.

FIG. 8 illustrates the layout of the pits on the optical disc. 801 is a groove track of a guide groove formed in a spiral shape in order to record data, and 802 is a land track which lies between groove tracks. 803 is a first half repeated pit sequence formed such that it is displaced to the outer side or inner side from the center of the groove track and 804 is a second half repeated pit sequence formed consecutively to the aforementioned first half repeated pit sequence, such that it is displaced from the center of the groove track in a symmetrical position to the aforementioned first half repeated pit sequence, with respect to the track center. The pits are formed in repeating patterns, wherein the pit-to-pit interval of the displaced bit sequences in the radial direction is 1.19 $\mu$m, the pit width is 0.36 $\mu$m, the pit depth is $\lambda/6$, the pit length is 0.462 $\mu$m, and the pit-to-pit interval in the tangential direction is 1.12 $\mu$m, the pits being displaced to the inner side or the outer side by a distance of 0.3 $\mu$m from the track center to the pit center. The space Ls forming the interval at which these shifted pits are repeated satisfies the equation Lp<Ls<2Lp, where Lp is the bit length.

FIGS. 21A, 21B and 21C each show an example where a summed signal output from a two-split photo detector is reproduced. Here, since the device is in a tracking on state, the light spot operates along the center of the tracks.

In the reproduced signal waveform, when the R tilt angle is 0° (FIG. 21B), there is a relationship of Ab=Bb between the lower levels Ab and Bb of the summed signal output modulated by the pit sequences when the repeated pits in the first half section are reproduced and when the repeated pits in the second half section are reproduced, respectively. If an R tilt of 0.4° occurs (FIG. 21A), then an aberration is generated in the light spot, due to the R tilt. In this case, the lower level Ab of the summed signal output reproduced from the first half section repeated pit sequence differs from the lower level Bb of the summed signal output reproduced from the second half section repeated pit sequence. The tilt detecting section saves the lower signal level Ab−Bb of the summed signal outputs from the first half and second half sections as the detection value of the tilt detecting section.

If an R tilt of −0.4° occurs (FIG. 21C), then an aberration is generated in the light spot, due to the R tilt. In this case, the lower level A of the summed signal output reproduced from the first half section repeated pit sequence differs from the lower level B of the summed signal output reproduced from the second half section repeated pit sequence. The tilt detecting section saves the lower signal level A−B of the summed signal outputs from the first half and second half sections as the detection value of the tilt detecting section.

The amplitude of the summed signal outputs for the first half and second half sections are saved as DC voltage values by a sample hold circuit, the differential Ab−Bb between the saved value Ab for the first half summed signal output and the saved value Bb for the second half summed signal output is taken as a tilt detection value, and the tilt control section takes this tilt detection value as the tilt angle and corrects the tilt angle accordingly.

Figure 14:
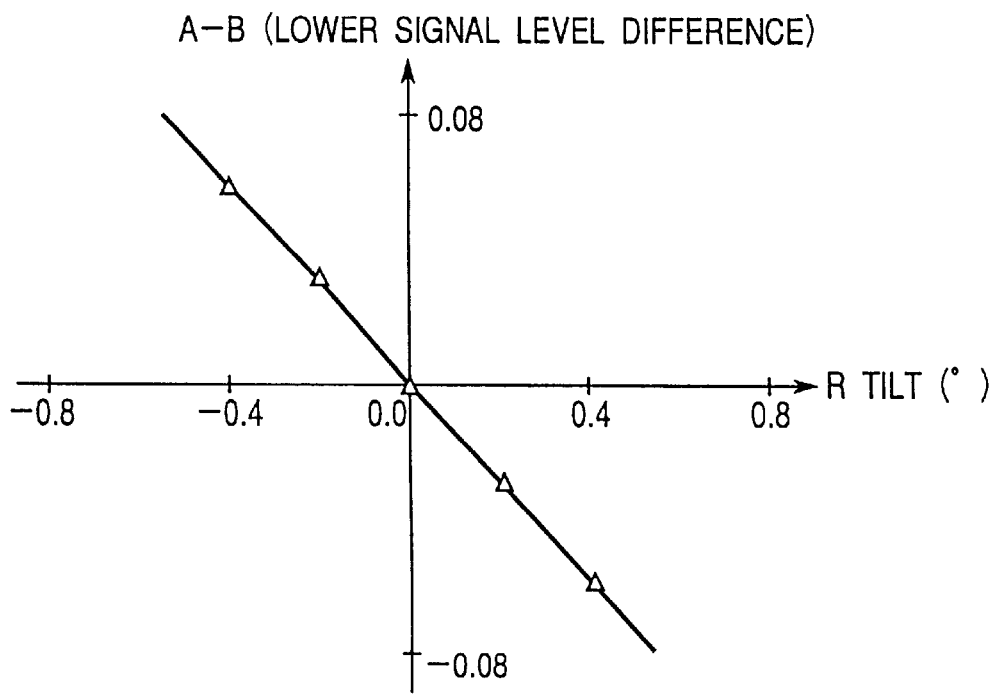
FIG. 14 is a graph for describing the relationship between R tilt and the lower signal level difference of the summed signals from repeated continuous pit sequences in a first embodiment of the present invention.

FIG. 14 shows simulation results for the relationship between the amount of R tilt in a state where R tilt occurs and the detection value Ab−Bb detected by the tilt detecting section.

The optical conditions used in the simulation are: 650 nm wavelength, NA=0.6, radial direction RIM intensity=0.25, tangential direction RIM intensity=0.83. Furthermore, these results relate to a case where the light spot tracks along the center of the track. If no R tilt occurs (FIG. 21B), the difference Ab−Bb between the lower levels of the summed signal outputs is 0. If R tilt does occur (FIG. 21A or 21C), there is an aberration in the light spot, and a disparity arises between the quantity of light diffracted by the repeated pits in the first half section and the quantity of light diffracted by the repeated pits in the second half section. The graph in FIG. 14 plots the difference Ab−Bb between the lower level Ab of the summed signal output in the first half section and the lower level Bb of the summed signal output in the second half section.

The tilt detecting section detects the tilt angle by taking the lower signal level difference Ab−Bb as the tilt angle detection value.

For example, if the lower signal level difference Ab−Bb of the summed signal outputs, which is the detection value detected by the tilt detecting section 107, is −0.06, then from FIG. 14, the R tilt is +0.4°, and hence the tilt correcting section 108 transmits a tilt correction value corresponding to this detection value to the tilt controlling section 109, and the R tilt angle is corrected by the tilt controlling section 109 driving the tilt platform 103.

In the description given here, the difference between the lower signal levels of the summed signal outputs from first half and second half repeated pit sequences was taken as the detection value for the tilt control section, but it is also possible to use the upper signal level difference At−Bt in the summed signal outputs of the repeated bit sequences as the tilt detection value, instead of the lower signal level difference Ab−Bb in the summed signal outputs.

In the description given here, the difference between the lower signal levels of the summed signal outputs from first half and second half repeated pit sequences was taken as the detection value for the tilt control section, but it is also possible to use the signal amplitude difference C−D in the summed signal outputs of the repeated bit sequences as the tilt detection value, instead of the lower signal level difference Ab−Bb in the summed signal outputs.

As described later with reference to FIG. 26 and FIGS. 27A, 27B, 27C and 27D, the difference between the summed signal for the first half repeated pit sequence and the summed signal for the second half repeated pit sequence may also be used in off-track detection. As the foregoing reveals, since the summed signals follow a sinusoidal curve, the value of the summed signals can be gathered in one of three ways: (i) finding the upper signal level; (ii) finding the lower signal level; or (iii) finding the amplitude of the sinusoidal curve. If one of the approaches (i), (ii), (iii) is adopted when using method (4) for detecting tilt, then one of the other remaining approaches is used for off-track detection. Thereby, it is possible to avoid complete coincidence between the signal used for tilt detection and the signal used for off-track detection.

The application of this R tilt detection method is not limited to the optical conditions used in this simulation.

The tilt detection value has a standard value of 1 when 100% of the light is reflected back by the mirror section in the two-split photo detector.

Next, a description is given of method (5) whereby the tilt angle is detected by comparing the amplitude in the first half and the second half of a reproduction signal output as the difference signal of a two-split photo detector, when continuous zigzag-shaped pits previously formed in the optical disc are reproduced.

FIG. 23 illustrates the layout of the pits on the optical disc. 2301 is a groove track of a guide groove formed in a spiral shape in order to record data, and 2302 is a land track which lies between groove tracks. 2303 is a first half repeated pit sequence formed by deviating to the outer side or inner side from the center of the groove track and 2304 is a second half repeated pit sequence formed consecutively to the aforementioned first half repeated pit sequence, by deviating from the center of the groove track in a symmetrical position to the aforementioned first half repeated pit sequence, with respect to the track center. The pits are formed in repeating patterns, wherein the pit-to-pit interval of the displaced bit sequences in the radial direction is 1.19 $\mu$m, the pit width is 0.36 $\mu$m, the pit depth is $\lambda/6$, the bit length is 0.462 $\mu$m, and the pit-to-pit interval in the tangential direction is 1.12 $\mu$m, the pits being displaced to the inner side or the outer side by a distance of 0.3 $\mu$m from the track center to the pit center.

Here, the difference signal output of a two-split photo detector with tracking on is described. Since the device is in a tracking on state, the light spot operates along the center of the tracks.

In FIG. 23, N1 is one two-split photo detector and N2 is a further detector. When the continuous pits configured in a displaced fashion from the track center are reproduced, one of the detectors is modulated significantly by the light diffracted by the pits, whilst the other detector is not affected greatly by light diffraction due to the pits and shows little change in light intensity. The difference signal output is the differential output N1–N2 of N1 and N2, and is called N–.

FIGS. 22A, 22B and 22C shows an example where a difference signal output from a two-split photo detector is reproduced.

In the reproduced signal waveform, when the R tilt angle is 0°, there is a relationship of I=J between the amplitudes I and J of the signals modulated by the pit sequences when the repeated pits in the first half section are reproduced and when the repeated pits in the second half section are reproduced. If an R tilt of 0.40 occurs, then an aberration is generated in the light spot, due to the R tilt. In this case, the amplitude I of the difference signal output reproduced from the first half section repeated pit sequence differs from the amplitude J of the difference signal output reproduced from the second half section repeated pit sequence. The tilt detecting section saves the amplitude difference I–J of the difference signal outputs from the first half and second half sections as the detection value of the tilt detecting section.

If an R tilt of −0.40 occurs, then an aberration is generated in the light spot, due to the R tilt.

In this case, the amplitude I of the difference signal output reproduced from the first half section repeated pit sequence differs from the amplitude J of the difference signal output reproduced from the second half section repeated pit sequence. The tilt detecting section saves the amplitude difference I–J of the difference signal outputs from the first half and second half sections as the detection value of the tilt detecting section.

The amplitude of the difference signal outputs for the first half and second half sections are saved as DC voltage values by a sample hold circuit, the differential I–J between the saved value I for the first half difference signal output and the saved value J for the second half difference signal output is taken as a tilt detection value, and the tilt control section takes this tilt detection value as the tilt angle and corrects the tilt angle accordingly.

Figure 15:
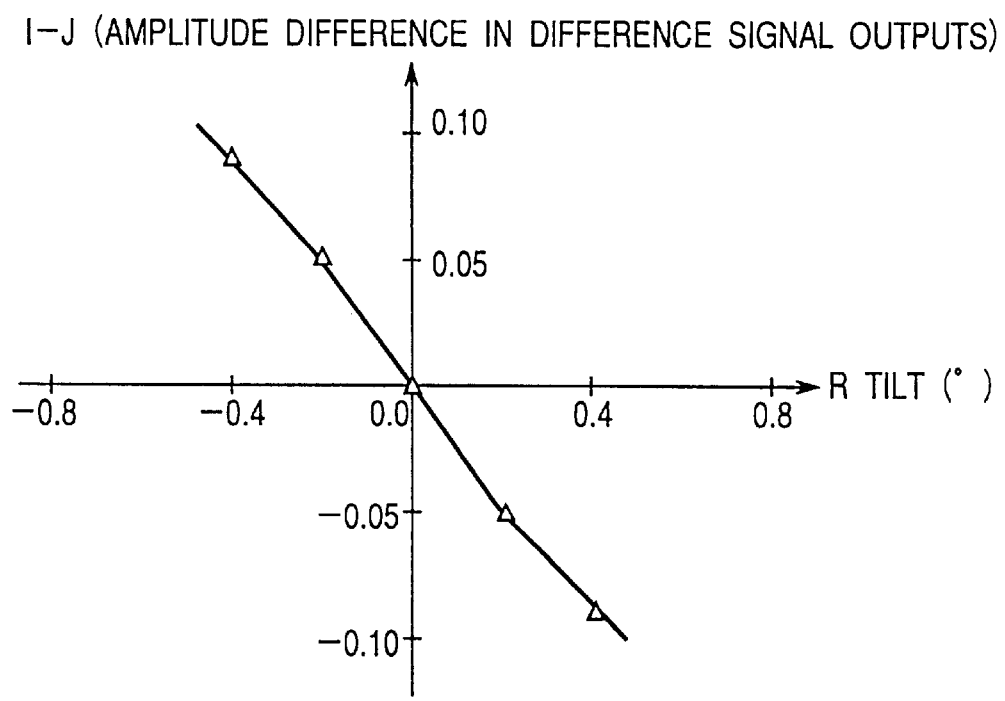
FIG. 15 is a graph for describing the relationship between R tilt and the difference in amplitude of the difference signal from the repeated continuous pit sequences in a first embodiment of the present invention.

FIG. 15 shows simulation results for the relationship between the amount of R tilt in a state where R tilt occurs and the detection value I–J detected by the tilt detecting section. The optical conditions used in the simulation are: 650 nm wavelength, NA=0:6, radial direction RIM intensity=0.25, tangential direction RIM intensity=0.83. Furthermore, these results relate to a case where the light spot tracks along the center of the track. In FIG. 15, if no R tilt occurs, then the differential I–J between the amplitudes of the difference signal outputs is 0. If R tilt does occur, there will be an aberration in the light spot, and a disparity arises between the quantity of light diffracted by the repeated pits in the first half section and the quantity of light diffracted by the repeated pits in the second half section. The graph in FIG. 15 plots the amplitude difference I–J between the amplitude I of the first half difference signal output and the amplitude J of the second half difference signal output.

The tilt detecting section detects the tilt angle by taking the amplitude difference I–J between the difference signal outputs as the detection value for the tilt angle.

For example, if the amplitude difference I–J between the difference signal outputs, which is the detection value detected by the tilt detecting section 107, is −0.09, then from FIG. 15, the R tilt is +0.4°, and hence the tilt correcting section 108 transmits a tilt correction value corresponding to this detection value to the tilt controlling section 109, and the R tilt angle is corrected by the tilt controlling section 109 driving the tilt platform 103.

Figure 16:
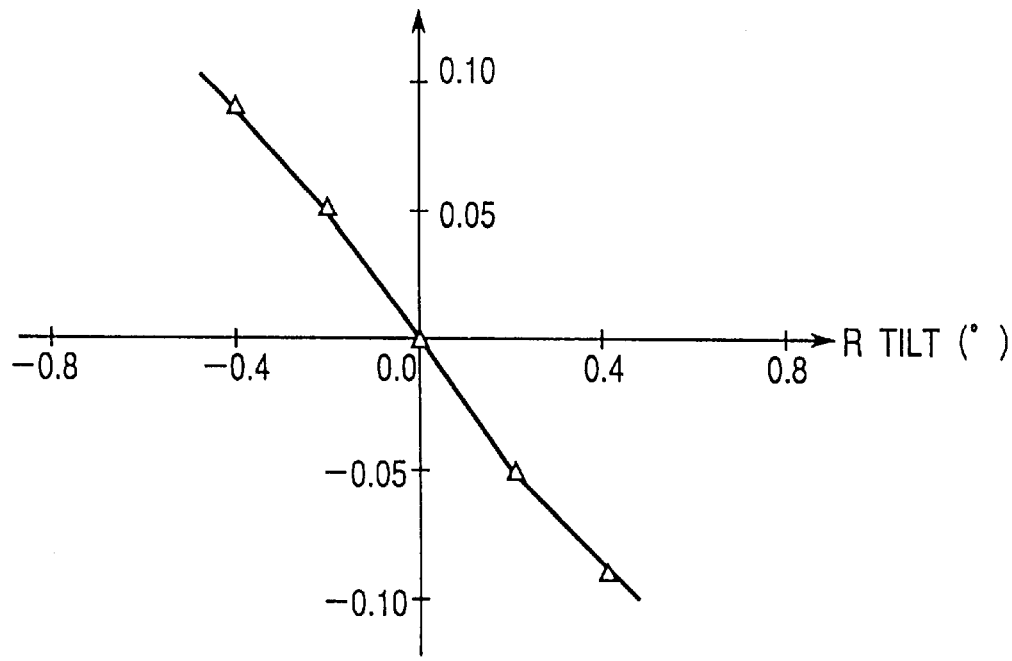
FIG. 16 is a graph for describing the relationship between R tilt and the difference in amplitude of the difference signal from the repeated continuous pit sequences in a first embodiment of the present invention, in a case where off-track is present.

FIG. 16 shows simulation results for the relationship between the degree of R tilt and the detection value I–J detected by the tilt detecting section, in a state where the light spot is positioned +0.02 $\mu$m off-track from the center of the track. The optical conditions used in the simulation are: 650 nm wavelength, NA=0.6, radial direction RIM intensity=0.25, tangential direction RIM intensity=0.83. Furthermore, these results relate to a case where the light spot tracks along the center of the track. In FIG. 16, if no R tilt occurs, then the difference I–J between the amplitudes of the difference signal outputs is 0. If R tilt does occur, there is an aberration in the light spot, and a disparity arises between the quantity of light diffracted by the repeated pits in the first half section and the quantity of light diffracted by the repeated pits in the second half section. The graph in FIG. 16 plots the amplitude difference I–J between the amplitude I of the first half difference signal output and the amplitude J of the second half difference signal output. The graph in FIG. 16 is virtually the same as the graph in FIG. 15. This indicates that the detection results for the tilt angle are the same in a case where the light spot is in the center of the track (FIG. 15) and a case where the light spot is displaced by +0.02 μm from the center of the track (FIG. 16).

The tilt detecting section detects the tilt angle by taking the amplitude difference I−J of the difference signal outputs as the detection value for the tilt angle.

For example, if the amplitude difference I−J of the difference signal outputs, which is the detection value detected by the tilt detecting section 107, is −0.09, then from FIG. 16, the R tilt is +0.40, and hence the tilt correcting section 108 transmits a tilt correction value corresponding to this detection value to the tilt controlling section 109, and the R tilt angle is corrected by the tilt controlling section 109 driving the tilt platform 103.

In this case, it is possible to detect the R tilt angle accurately, even if the light is off track from the center of the track.

In the description given here, the difference between the amplitudes of the difference signal outputs from first half and second half repeated pit sequences was taken as the detection value for the tilt control section, but it is also possible to use the upper signal level difference It−Jt in the difference signal outputs of the repeated bit sequences as the tilt detection value, instead of the amplitude difference I−J in the summed signal outputs.

The application of this R tilt detection method is not limited to the optical conditions used in this simulation.

The tilt detection value has a standard value of 1 when 100% of the light is reflected back by the mirror section in the two-split photo detector.

Next, a description is given of method (6) whereby the tilt angle is detected by comparing the lower signal level in the first half and the second half of a reproduction signal output as the sum signal of a two-split photo detector, when isolated zigzag-shaped pits previously formed in the optical disc are reproduced.

Figure 9:
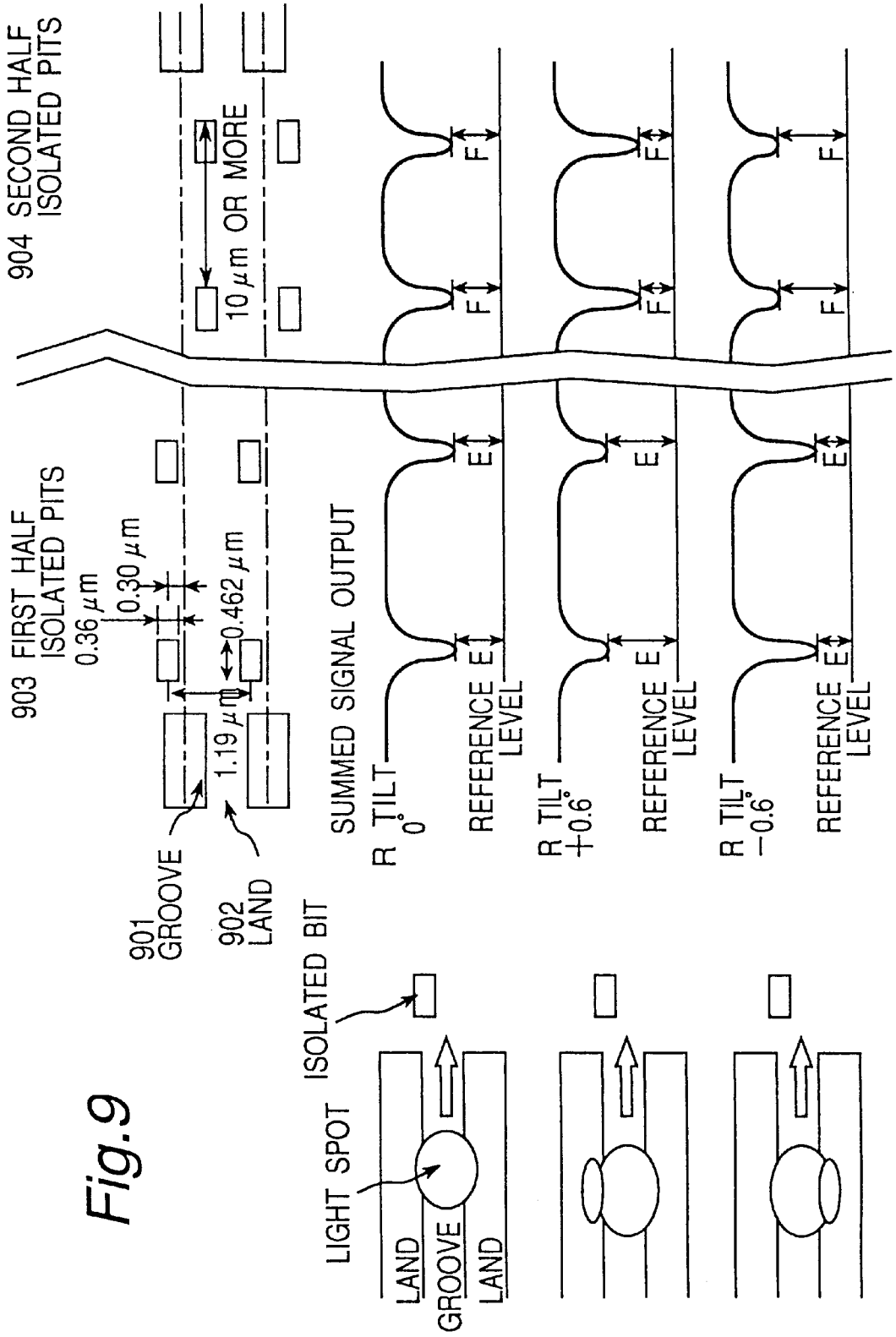
FIG. 9 is a compositional diagram of an optical disc according to a first embodiment of the present invention.

FIG. 9 shows a view of the configuration of pits on an optical disc containing isolated pits and a reproduction signal waveform relating to same. 901 is a groove track of a guide groove formed in a spiral shape in order to record data, and 902 is a land track which lies between groove tracks. 903 denotes first half isolated pits formed by deviating to the outer side or inner side from the center of the groove track and 904 denotes second half isolated pits formed consecutively to the aforementioned first half isolated pits, by deviating from the center of the groove track in a symmetrical position to the aforementioned first half isolated pits with respect to the track center. The pits are formed in such a manner that the pit-to-pit interval of the displaced bits in the radial direction is 1.19 μm, the pit-to-pit interval in the track direction is at least 10 μm, the pit width is 0.36 μm, the pit depth is λ/6, the bit length is 0.462 μm, and the pits are displaced to the outer side or the inner side by a distance of 0.3 μm from the track center to the pit center. Here, the space Ls forming the interval at which these shifted pits are repeated satisfies the equation 20Lp<Ls, where Lp is the pit length.

The reproduced signal waveform is an example of a reproduced summed signal output from a two-split photo detector. Here, since the device is in a tracking on state, the light spot operates along the center of the tracks.

In the reproduced signal waveform, when the R tilt angle is 0°, there is a relationship of E=F between the lower levels E and F of the summed signal outputs modulated by the pits, when the isolated pits in the first half section are reproduced and when the isolated pits in the second half section are reproduced, respectively. If an R tilt of +0.60 occurs, then an aberration is generated in the light spot, due to the R tilt. In this case, the lower level E of the summed signal output reproduced from the first half section isolated pits differs from the lower level F of the summed signal output reproduced from the second half section isolated pits. The tilt detecting section saves the lower signal level difference E−F of the summed signal outputs from the first half and second half sections as the detection value of the tilt detecting section.

If an R tilt of −0.60 occurs, then an aberration is generated in the light spot, due to the R tilt. In this case, the lower level E of the summed signal output reproduced from the first half section isolated pits differs from the lower level F of the summed signal output reproduced from the second half section isolated pits. The tilt detecting section saves the lower signal level difference E−F of the summed signal outputs from the first half and second half sections as the detection value of the tilt detecting section.

The amplitudes of the summed signal outputs for the first half and second half sections are saved as DC voltage values by a sample hold circuit, the differential E−F between the saved value E for the first half summed signal output and the saved value F for the second half summed signal output is taken as a tilt detection value, and the tilt control section takes this tilt detection value as the tilt angle and corrects the tilt angle accordingly.

Figure 17:
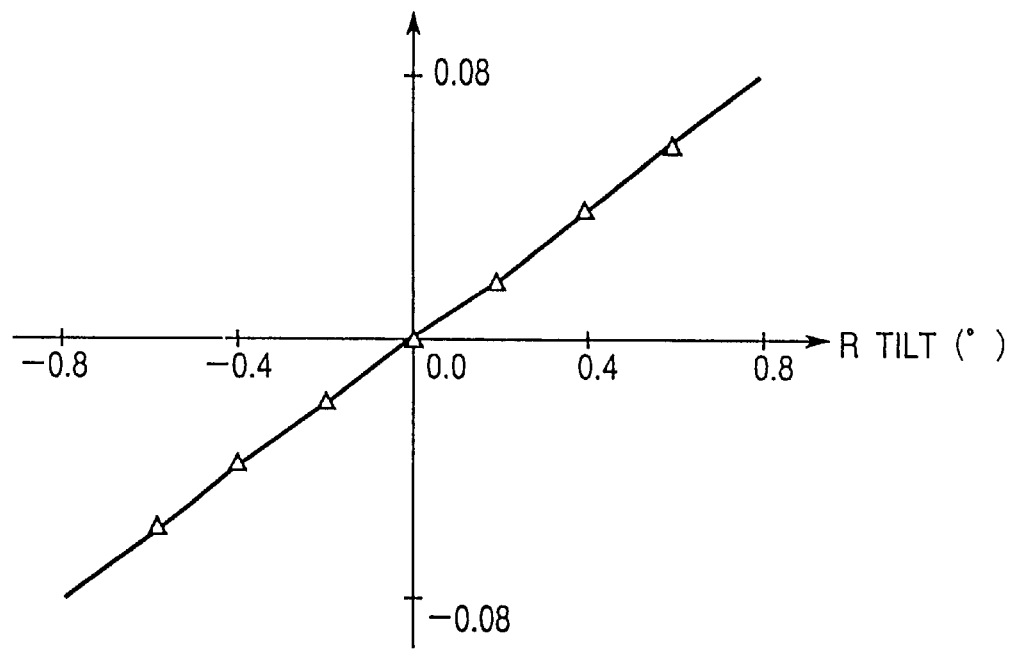
FIG. 17 is a graph for describing the relationship between R tilt and the lower signal level difference of the summed signals from isolated pits in a first embodiment of the present invention.

FIG. 17 shows simulation results for the relationship between the amount of R tilt in a state where R tilt occurs and the detection value E−F detected by the tilt detecting section. The optical conditions used in the simulation are: 650 nm wavelength, NA=0.6, radial direction RIM intensity =0.25, tangential direction RIM intensity =0.83. Furthermore, these results relate to a case where the light spot tracks along the center of the track. In FIG. 17, if no R tilt occurs, the difference E−F between the lower levels of the summed signal outputs is 0. If R tilt does occur, there is an aberration in the light spot, and a disparity arises between the quantity of light diffracted by the isolated pits in the first half section and the quantity of light diffracted by the isolated pits in the second half section. The graph in FIG. 17 plots the difference E−F between the lower level E of the summed signal output in the first half section and the lower level F of the summed signal output in the second half section.

The tilt detecting section detects the tilt angle by taking the lower signal level difference E−F of the summed signal outputs as the tilt angle detection value.

For example, if the lower signal level difference E−F of the summed signal outputs, which is the detection value detected by the tilt detecting section 107, is +0.06°, then from FIG. 17, the R tilt is +0.6°, and hence the tilt correcting section 108 transmits a tilt correction value corresponding to this detection value to the tilt controlling section 109, and the R tilt angle is corrected by the tilt controlling section 109 driving the tilt platform 103.

The application of this R tilt detection method is not limited to the optical conditions used in this simulation.

The tilt detection value has a standard value of 1 when 100% of the light is reflected back by the mirror section in the two-split photo detector.

In this way, the detection value detected by the tilt detecting section is used by the tilt correcting section to calculate a tilt angle, and the tilt control section then causes the tilt platform to move accordingly, thereby eliminating R tilt and improving the quality of the recorded and reproduced signal.

In order to detect R tilt using one of the aforementioned methods (1) to (6), desirably, the light spot scans along the center of a track formed previously by a guide groove. The divergence between the center of the track of the optical disc and the light spot is called the off-track. If the off-track is 0, in other words, if the R tilt is detected by one of the methods (1) to (6) above in a case where the light spot is scanning along the center of a guide groove formed previously in the optical disc, then it is possible to detect R tilt more accurately.

A method for correcting off-track is described below.

Off-track is controlled using the summed signal output of a signal reproduced by a light spot from a repeated pit sequence formed previously on the optical disc in a deviating fashion.

FIG. 24 illustrates the layout of the pits on the optical disc. 2401 is a groove track of a guide groove formed in a spiral shape in order to record data, and 2402 is a land track which lies between groove tracks. 2403 is a first half repeated pit sequence formed by deviating to the outer side or inner side from the center of the groove track and 2404 is a second half repeated pit sequence formed consecutively to the aforementioned first half repeated pit sequence, by deviating from the center of the groove track in a symmetrical position to the aforementioned first half repeated pit sequence with respect to the track center. The pits are formed in repeating patterns, wherein the pit-to-pit interval of the displaced bit sequences in the radial direction is 1.19 μm, the pit width is 0.36 μm, the pit depth is λ/6, the bit length is 0.462 μm, and the pit-to-pit interval in the tangential direction is 1.12 μm, the pits being displaced to the inner side or the outer side by a distance of 0.3 μm from the track center to the pit center.

FIGS. 25A, 25B and 25C each shows an example where a summed signal output from a two-split photo detector is reproduced.

In the reproduced signal waveform, when the off-track is 0, there is a relationship of L=M between the amplitudes L and M of the signals modulated by the pit sequences when the repeated pits in the first half section are reproduced and when the repeated pits in the second half section are reproduced. If an off-track of 0.02 μm occurs, then there will a disparity in light quantity between the two two-split photo detectors, due to the off-track. In this case, the amplitude L of the summed signal output reproduced from the first half section repeated pit sequence differs from the amplitude M of the summed signal output reproduced from the second half section repeated pit sequence. The amplitude of the summed signal outputs for the first half and second half sections are saved as DC voltage values by a sample hold circuit, the differential L−M between the saved value L for the first half summed signal output and the saved value M for the second half summed signal output is taken as an off-track detection value, and this detection value is taken as the off-track position and the off-track position is corrected accordingly. In this case, it is possible to correct the off-track position regardless of the tilt.

Next, a method is described for correcting R tilt at different radial positions on the optical disc from the detection values detected by the tilt detecting section.

Figure 10:
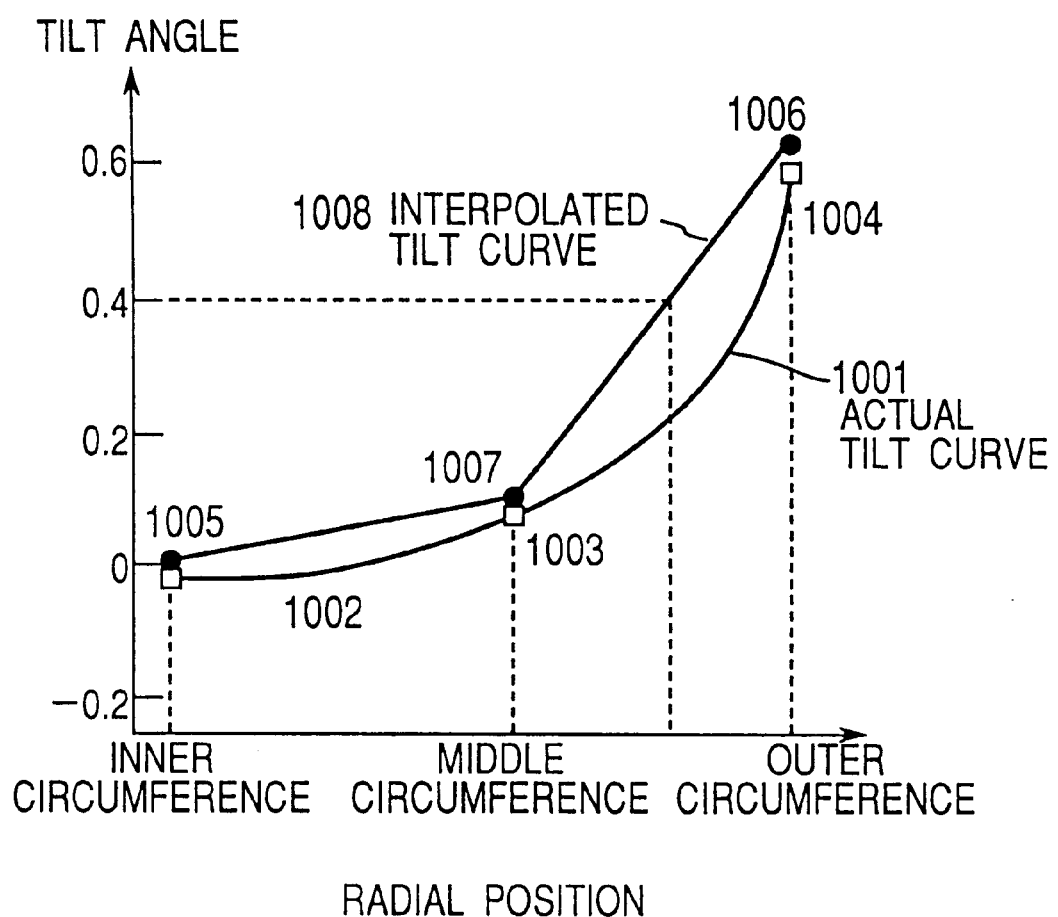
FIG. 10 is a graph showing the relationship between radial position and R tilt in a first embodiment of the present invention.

R tilt is caused by distortion of the disc, and therefore the magnitude of R tilt changes from the inner side to the outer side of the optical disc, as illustrated by curve 1001 in FIG. 10. in FIG. 10, 1001 is a tilt curve for representing the manner in which the inclination (tilt) of the recording surface of the optical disc with respect to the optical axis of the light beam changes with radial position on the optical disc, 1002 is a quantity of tilt (or tilt angle) at a prescribed radial position on the inner side of the tilt curve 1001, 1003 is a quantity of tilt at a prescribed radial position in the middle portion of the tilt curve 1001, and 1004 is a quantity of tilt at a prescribed radial position on the outer side of the tilt curve 1001.

Next, quantities of tilt as derived from the detection values detected by the tilt detecting section are described. 1005 is a quantity of tilt derived from the detection value detected by the aforementioned tilt detecting section at a prescribed radial position on the inner side of the optical disc, and 1006 is a quantity of tilt derived from the detection value detected by the aforementioned tilt detecting section at a prescribed radial position on the outer side of the optical disc.

1007 is a quantity of tilt derived from the detection value detected by the aforementioned tilt detecting section at a prescribed radial position in the middle portion of the optical disc, and 1008 is an interpolated curve 1008 which connects the quantity of tilt 1007 derived for the middle circumference, with the quantity of tilt 1005 derived for the inner side and the quantity of tilt 1006 derived for the outer circumference by straight lines.

When the optical disc is tilted, the quantity of tilt is different at the inner side and the outer side of the disc. In order to detect the difference in quantity of tilt according to the radial position, in the optical disc device according to the present invention, the quantity of tilt is detected at at least three radial positions, namely, the inner circumference, outer circumference, and middle circumference of the optical disc, as shown in FIG. 10. The quantity of tilt at a prescribed radial position between the inner and middle radial positions where the tilt angle is detected is derived from the value, at the prescribed radial position, of the curve 1008 linking the quantity of tilt 1005 derived from the detection value at the inner circumference with the quantity of tilt 1007 derived from the detection value at the middle circumference. The quantity of tilt at a prescribed radial position between the outer and middle radial positions where the tilt angle is detected is derived from the value, at the prescribed radial position, of the curve 1008 linking the quantity of tilt 1006 derived from the detection value at the outer circumference with the quantity of tilt 1007 derived from the detection value at the middle circumference.

In this case, it is possible to correct accurately the quantity of tilt 1007 derived at a prescribed position in the middle circumference of the optical disc and the actual quantity of tilt 1003 at the middle circumference of the optical disc, and therefore, compared to conventional methods, the tilt position can be corrected more reliably and accurately at any radial position on an optical disc wherein the quantity of tilt varies between the inner and outer circumferences of the disc, and the signal quality during recording and reproduction to and from the optical disc can be improved markedly.

Next, the operation of the tilt correcting section 108 is described. In FIG. 10, the tilt angle (R tilt) is 0° at the radial position on the inner circumference. Alternatively, the relative tilt angle at the inner circumference is 0°. At the outer circumference of the optical disc, the tilt angle is larger than at the inner circumference, due to the effects of warping of the disc. This warping varies between discs, and the characteristics of the magnitude of the tilt angle with respect to radial position are different for each disc.

When the radial position where the light spot converges on the surface of the optical disc moves towards the outer side of the disc, the tilt angle is detected by the tilt detecting section at the middle circumference and outer circumference of the disc, and if the tilt angle on the interpolated tilt curve 1008 differs by a threshold value (for example, 0.4°) or more from the tilt angle at the inner circumference, then the tilt correcting section instructs the tilt platform 103 to move in such a manner that the tilt angle becomes 0 at the radial position where the tilt angle has reached the aforementioned threshold value.

Thereby, it is possible to reduce a tilt angle caused by distortion of the disc which occurs from the inner side to the outer side of the disc by moving the tilt platform, thereby making it possible to improve signal quality during recording and reproduction to and from the optical disc.

The operations of detecting and controlling off-track are now described in more detail.

FIG. 26 illustrates the operation of a calculating circuit 104 which functions by receiving outputs a, b, c, d from four photo detecting elements in a four-split detector 100. This calculating circuit 104 generates:

TE signal (a+d)−(b+c),

FE signal (a+c)−(b+d),

RF signal: (a+b+c+d),

Off-track detection signals (OF signals):

Diagonal sum signal (a+c)

Diagonal sum signal (b+d)

The TE signal is transmitted to the tracking control section 106, and is used to control the tracking position of the light spot on the track of the optical disc. The FE signal is transmitted to the focus control section 105, and is used to control the focal position of the light spot on the track of the optical disc. The RF signal is a reproduction signal obtained by reading out data recorded on the optical disc, and it is submitted to data processing. The RF signal is transmitted to the off-track detecting section 110, where it is used to detect the off-track position. The off-track detection signal (OF signal) is transmitted to the off-track detecting section 110, where it is used to detect the off-track position.

Next, the process whereby the off-track position is detected from the off-track detection signal in the off-track detecting section 110 is described.

The off-track position is detected by extracting the phase difference between two off-track detection signals.

The details of this phase difference signal are now described with reference to FIGS. 27A, 27B, 27C and 27D.

When the light spot 2701 is located in the center of the track, the intensity of the diffracted light at the detector will be as illustrated in FIG. 27B, and hence the diagonal difference signal (a+c)−(b+d) will be 0. Even if the light spot and pit sequences proceed in the direction of the arrow as the disc rotates, this value will always remain zero. If, however, the light spot is displaced from the track, as in FIG. 27A or FIG. 27C, then when the light spot moves in the direction of the arrow with the rotation of the disc, the diagonal difference signals will both assume a sinusoidal output, and since these outputs have a +90° or −90° phase relationship with respect to the RF signal (a+b+c+d), it is possible to detect how far the light spot is off track from the center of the pits by detecting the phase difference between the diagonal difference signals and the RF signal.

The difference between the summed signal for the first half repeated pit sequence and the summed signal for the second half repeated pit sequence may also be used in off-track detection. Similarly to the description relating to FIGS. 21A, 21B and 21C, since the diagonal sum signals follow a sinusoidal curve, the values of the diagonal sum signals can be gathered in one of three ways: (i) finding the upper signal level; (ii) finding the lower signal level; or (iii) finding the amplitude of the sinusoidal curve.

FIG. 27D is a waveform diagram showing the relationship between the phase difference of the diagonal difference signal and the degree of off-track. In this diagram, (Bsig) is the output point when the light spot passes through the center of the pits, and (Asig) and (Csig) are output points when the light spot passes to the left-hand side or right-hand side of the pits, respectively. The off-track position from the center of the pits can be detected using this phase difference.

Figure 28A:
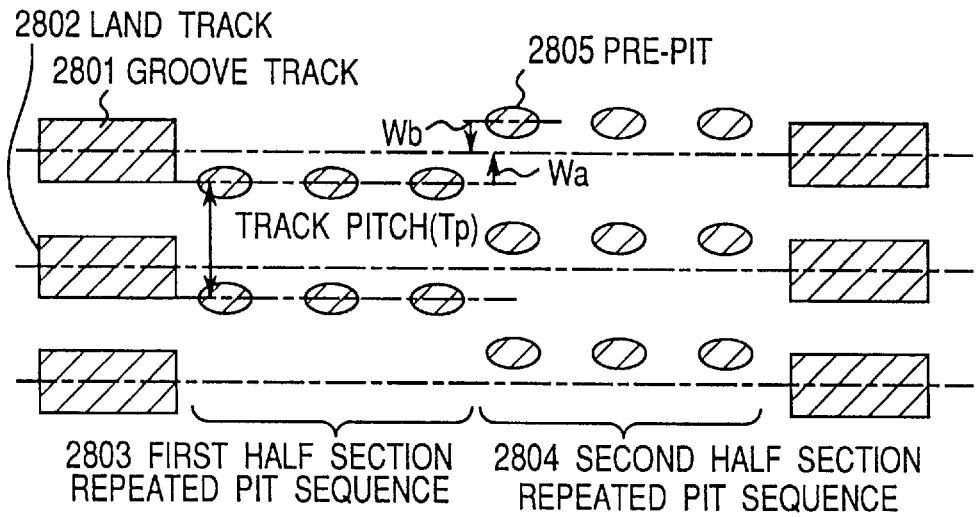
FIGS. 28A, 28B and 28C are diagrams for describing an off-track detection method according to a first embodiment of the present invention.

As shown in FIG. 28A, the indented pre-pits 2805 previously recorded in the optical disc comprise: a first half section pre-pit sequence 2803 of pits which are located consecutively in positions displaced by Wa (=Tp/4) from the center of the groove track of the guide groove in a lateral direction to the track; and a second half section pre-pit sequence 2804 of pits which are located consecutively in positions displaced similarly to the opposite side of the center of the groove track from the first half section pre-pit sequence. Here, the displacement width Wa of the first half section pre-pits is equal to the displacement width Wb of the second half section pre-pits Wb. The pits located at (Wa=Wb) are a consecutive sequence of pits of a single frequency.

Figure 28B:
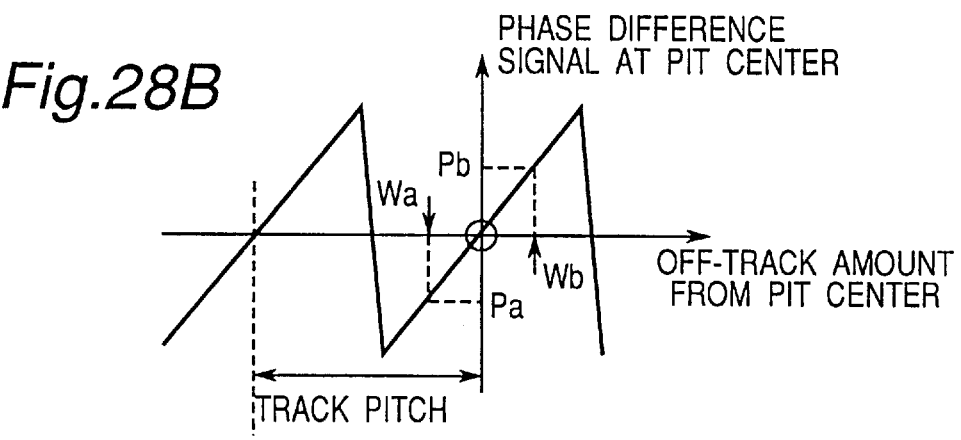
Figure 28C:
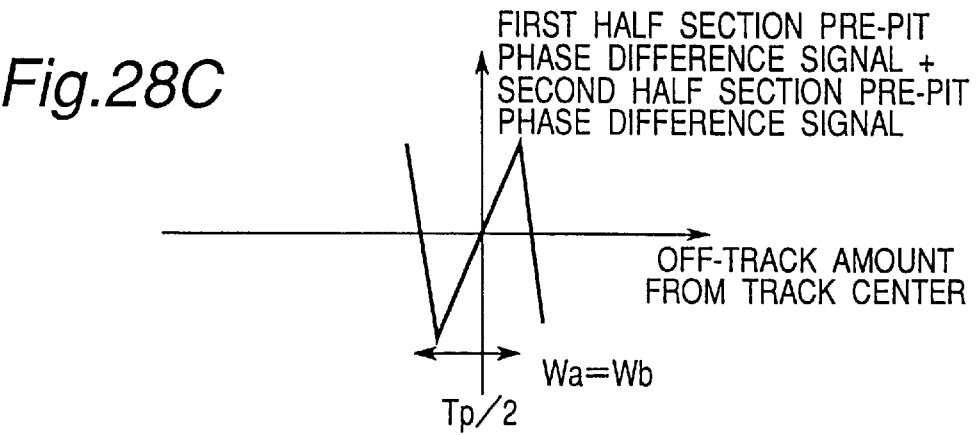

FIG. 28B is a graph of the phase difference signal derived from the diagonal difference signal centered on a pit. When the light spot passes through the center of the groove track of the first half section pre-pit sequence, the phase difference signal output is Pa, and when the light spot passes through the center of the groove track of the second half section pre-pit sequence, then the phase difference signal output is Pb. FIG. 28C illustrates the results obtained when the phase difference signal for the first half section pre-pit sequence and the phase difference signal for the second half section pre-pit sequence are saved and the sum of the first half section pre-pit sequence output and the second half section pre-pit sequence output is calculated by the off-track detecting section. If the light spot passes through the center of the track, then this phase difference signal will be 0.

The results described here are obtained from a computer simulation based on the following conditions. The pits formed repeated displaced pit sequences wherein: laser wavelength (X)=650 nm; object lens NA=0.6; tangential direction RIM intensity=0.83; radial direction RIM intensity=0.25, disc track pitch=1.19 µm, pit depth=λ/6, pit width=0.36 µm, cycle of repeated pits in linear direction=1.12 µm, and pit length=0.46 µm.

FIG. 29 illustrates the characteristics obtained when R tilt occurs.

FIG. 29 shows the off-track detection signals calculated from the phase difference signals from the first half section displaced pits and the second half section displaced pits, in cases where, in the order (a), (b), (c), an R tilt of −0.6°, ±0.0°, and +0.6° is applied. The horizontal axis represents the amount of off-track with respect to the track center. The vertical axis represents the off-track detection signal. When the off-track detection signal is 0, the light spot is in the track center. When there is no R tilt, as in curve (b), it can be seen from the graph that an off-track detection signal corresponding to the amount of off-track is obtained. Moreover, when the off-track position is 0, the off-track detection signal also becomes 0.

When R tilt is present, for example, when there is a tilt of −0.6° as in curve (a), it can be seen from the graph that an off-track detection signal corresponding to the amount of off-track is obtained. Moreover, when the off-track position is 0, the off-track detection signal also becomes 0.

This applies similarly to curve (c).

In this way, by reproducing a phase difference signal and continuous pre-pits in a displaced configuration, it is possible to detect the amount of off-track accurately, without being affected by the amount of R tilt, and if this system is used in the off-track detecting section according to the embodiment described in FIG. 1, it is possible to obtain good tilt detection and tilt control results.

Therefore, tracking accuracy is improved, cross-erasure effects, whereby adjacent tracks are erased during recording, can be eliminated, and the quality of signals recorded onto adjacent tracks can be improved.

(Advantages of the Invention)

According to the optical disc device and the optical disc tilt control method according to the present invention, it is possible to improve signal quality during recording and reproduction, without needing to provide an optical system for detecting tilt angle separately from the optical system for recording and reproduction, by detecting a tracking signal and a tilt angle, independently or in combination with each other, by a groove track, land track and repeated pit sequences formed such that the centers thereof are displaced towards the outside or the inside from the center of the groove track, previously recorded on an optical disc, and correcting the tilt angle by a tilt correcting section and a tilt controlling section. Consequently, it is not necessary to provide a separate tilt detector, thereby enabling the installation size of the device to be reduced and allowing costs to be restricted.

Moreover, it is also possible to improve recording and reproduction characteristics markedly, without degrading signal quality during recording or reproduction, by deriving the quantity of tilt at any radial position on the optical disc from at least three detection values at the inner circumference, middle circumference and outer circumference of the disc, as in the tilt detection method illustrated in FIG. 10.

What is claimed is:

1. A tilt detection device for detecting inclination of a recording surface of an optical disc having continuous tracks and first shifted pits and second shifted pits formed such that the first shifted pits and the second shifted pits are orthogonally displaced respectively to a first side and a second side of a track from the centerline of the track, said continuous track being located between the second and first shifted pits along the centerline, said tilt detection device comprising:

an optical head operable to record and reproduce signals by focusing a light spot onto the optical disc;

a two-split photo detector operable to receive light reflected from the optical disc, said photo detector including first and second photo detecting elements oriented so that said two-split photo detector is divided in a direction parallel to the track;

tracking control means for controlling the position of the light spot onto the continuous track based on a signal obtained from said two-split photo detector, off-track detecting means for detecting an off track amount of the light spot based on a reproduction signal obtained by said two-split photo detector from said optical head moving along the track relative to the first shifted pits and second shifted pits; and tilt detecting means for detecting, while the light spot is located substantially at the center of the continuous track by the control of said tracking control means and off-track detecting means, inclination of the recording surface of the optical disc, by comparing a first summed signal representing the sum of the outputs from said first and second photo detecting elements, when reflected light from the first shifted pits is received by said two-split photo detector, with a second summed signal representing the sum of the outputs from said first and second photo detecting elements when reflected light from the second shifted pits is received by said two-split photo detector.

2. The tilt detection device according to claim 1, wherein said tilt detecting means is operable for comparing the lower level of the absolute value of the envelope signal of the first summed signal with the lower level of the absolute value of the envelope signal of the second summed signal.

3. The tilt detection device according to claim 1, wherein said tilt detecting means is operable for comparing the upper level of the absolute value of the envelope signal of the first summed signal with the upper level of the absolute value of the envelope signal of the second summed signal.

4. The tilt detection device according to claim 1, wherein said tilt detecting means is operable for comparing the amplitude of the first summed signal with the amplitude of the second summed signal.

5. The tilt detection device according to claim 1, wherein said off-track detecting means is operable for outputting to said tracking control means an off-set amount representing the amount of displacement between the center of the track and the center of the light spot, by comparing a third summed signal representing the sum of the outputs from said first and second photo detecting elements when reflected light from the first shifted pits is received by said two-split photo detector, with a fourth summed signal representing the sum of the outputs from said first and second photo detecting elements when reflected light from the second shifted pits is received by said two-split detector.

6. The tilt detection device according to claim 1, wherein the first shifted pits are provided in a repeated continuous fashion, and the second shifted pits are provided in a repeated continuous fashion, consecutively to the first shifted pits.

7. The tilt detection device according to claim 6, wherein a space Ls, representing the interval at which the first shifted pits are repeated is such that Lp<Ls<2Lp, where Lp is the pit length.

8. The tilt detection device according to claim 6, wherein a space Ls representing the interval at which the first shifted pits are repeated is such that 20Lp<Ls, where Lp is the pit length.

9. An optical disc recording and reproducing device for detecting and correcting inclination of a recording surface of an optical disc having continuous tracks and first shifted pits and second shifted pits formed such that the first shifted pits and the second shifted pits are orthogonally displaced respectively to a first side and a second side of a track from the centerline of the track, said continuous track being located between the second and first shifted pits along the centerlines said optical disc recording and reproducing device comprising:

an optical head operable to record and reproduce signals by focusing a light spot onto the optical disc;

a two-split photo detector operable to receive light reflected from the optical disc, said photo detector including first and second photo detecting elements oriented so that said two-split photo detector is divided in a direction parallel to the track;

tracking control means for controlling the position of the light spot onto the continuous track based on a signal obtained from said two-split photo detector, off-track detecting means for detecting an off-track amount of the light spot based on a reproduction signal obtained by said two-split photo detector from said optical head moving along the track relative to the first shifted pits and the second shifted pits;

tilt detecting means for detecting, while the light spot is located substantially at the center of the track by the control of said tracking control means and off-track detecting means, inclination of the recording surface of the optical disc, by comparing a first summed signal representing the sum of the outputs from said first and second photo detecting elements, when reflected light from the first shifted pits is received by said two-split photo detector, with a second summed signal representing the sum of the outputs from said first and second photo detecting elements when reflected light from the second shifted pits is received by said two-split photo detector; and tilt correcting means for controlling the angle of the optical disc according to the quantity of tilt detected by said tilt detecting means.

10. A tilt detection method for detecting inclination of the recording surface of an optical disc having continuous tracks and first shifted pits and second shifted pits formed such that the first shifted pits and the second shifted pits are orthogonally displaced respectively to a first side and a second side of a track from the centerline of the track, said continuous track being located between the second and first shifted pits, said method comprising:

focusing flight spot onto the optical disc;

receiving light reflected from the optical disc by a photo detector including first and second photo detecting elements oriented so that the photo detector is divided in a direction parallel to the track;

performing tracking control for controlling the position of the light spot onto the continuous track based on a signal from the photo detector, detecting an off-track amount of the light spot based on a reproduction signal obtained by the photo detector from the optical head moving along the track relative to the first shifted pits and second shifted pits; and detecting, while the light spot is located substantially at the center of the track by control of the tracking control and off-track detection, inclination of the recording surface of the optical disc, by comparing a first summed signal representing the sum of the outputs from the first and second photo detecting elements when reflected light from the first shifted pits is received, with a second summed signal representing the sum of the outputs from the first and second photo detecting elements when reflected light from the second shifted pits is received.

11. A tilt detection device for detecting inclination of the recording surface of an optical disc having continuous tracks and first shifted pits and second shifted pits formed such that the first shifted pits and the second shifted pits are orthogonally displaced respectively to a first side and a second side of a track from the centerline of the track, said continuous track being located between said second and first shifted pits, said tilt detection device comprising:

an optical head for recording and reproducing signals by focusing a light spot onto said optical disc;

a two-split photo detector for receiving light reflected from said optical disc, said photo detector including a first photo detecting element and a second photo detecting element divided in a direction parallel to the track;

tracking control means for controlling the position of said light spot on said continuous track based on a signal obtained from said two-split photo detector; and tilt detecting means for detecting inclination of the recording surface of the optical disc;

characterized in that said tilt detection device contains off-track detecting means for detecting an off track amount of the light spot based on the reproduced signal obtained from said optical head moving along the track relatively to said first shifted pits and second shifted pits; and in that said tilt detecting means detects the inclination of the recording surface of the optical disc while the light spot is located substantially at the center of the continuous track by the control of said tracking control means and said off-track detecting means, said tilt detecting means comparing a first summed signal representing the sum of the outputs from the first and second photo detecting elements when reflected light from said first shifted pits is received by the two-split photo detector with a second summed signal representing the sum of the outputs from the first and second photo detecting elements when reflected light from said second shifted pits is received by the two-split photo detector.

12. The tilt detection device according to claim 11, wherein said tilt detecting means compares the lower level of the absolute value of the envelope signal of the first summed signal with the lower level of the absolute value of the envelope signal of the second summed signal.

13. The tilt detection device according to claim 11, wherein said tilt detecting means compares the upper level of the absolute value of the envelope signal of the first summed signal with the upper level of the absolute value of the envelope signal of the second summed signal.

14. The tilt detection device according to claim 11, wherein said tilt detecting means compares the amplitude of the first summed signal with the amplitude of the second summed signal.

15. The tilt detection device according to claim 11, wherein said off-track detecting means outputs an off-set amount representing the amount of displacement between the center of said track and the center of the light spot, by comparing a third summed signal representing the sum of the outputs from the first and second photo detecting elements when reflected light from said first shifted pits is received by the two-split photo detector, with a fourth summed signal representing the sum of the outputs from the first and second photo detecting elements when reflected light from said second shifted pits is received by the two-split detector, said off-set amount being added to said tracking control means.

16. An optical disc recording and reproducing device, comprising said tilt detection device according to claim 11, for detecting and correcting inclination of the recording surface of an optical disc.

17. An optical disc recording and reproducing device, comprising said tilt detection device according to claim 12, for detecting and correcting inclination of the recording surface of an optical disc.

18. An optical disc recording and reproducing device, comprising said tilt detection device according to claim 13, for detecting and correcting inclination of the recording surface of an optical disc.

19. An optical disc recording and reproducing device, comprising said tilt detection device according to claim 14, for detecting and correcting inclination of the recording surface of an optical disc.

20. An optical disc recording and reproducing device, comprising said tilt detection device according to claim 15, for detecting and correcting inclination of the recording surface of an optical disc.

21. A tilt detection method for detecting inclination of the recording surface of an optical disc having tracks and first shifted pits and second shifted pits formed such that the first shifted pits and the second shifted pits are orthogonally displaced respectively to a first side and a second side of a track from the center of the track, said continuous track being located between said second and first shifted pits, and tilt detection method comprising:

focusing a light spot onto the optical disc;

receiving light reflected from said optical disc by a photo detector including a first photo detecting element and a second photo detecting element divided in a direction parallel to the track;

performing tracking control for controlling the position of the light spot on a track; and detecting inclination of the recording surface of the optical disc; and detecting an off-track amount of the light spot based on the reproduced signal obtained from the optical head moving along the track relatively to the first shifted pits and second shifted pits, wherein said detecting of inclination of the recording surface of the optical disc contains the detecting while the light spot is located substantially at the center of the track by control of the off-track amount and said tracking control by comparing a first summed signal representing the sum of the outputs from the first and second photo detecting elements when reflected light from the first shifted pits is received, with a second summed signal representing the sum of the outputs from the first and second photo detecting elements when reflected light from the second shifted pits is received.

* * * * *

UNITED STATES PATENT AND TRADEMARK OFFICE
CERTIFICATE OF CORRECTION

PATENT NO.   : 6,157,600
DATED        : December 5, 2000
INVENTOR(S)  : Atsushi Nakamura et al.

It is certified that error appears in the above-identified patent and that said Letters Patent is hereby corrected as shown below:

Title page,
Item [56], References Cited, please add the following references:

U.S PATENT DOCUMENTS, please add the following three references:

| | | |
|---|---|---|
| 5,471,446 | 11/1995 | Tawaragi et al. |
| 5,914,925 | 6/1999 | Lee et al. |
| 4,866,688 | 9/1989 | Ohtake et al. |

FOREIGN PATENT DOCUMENTS, please add the following reference:
10-302319    11/1998    Japan Signed and Sealed this Eleventh Day of December, 2001

Attest:

NICHOLAS P. GODICI
Attesting Officer    Acting Director of the United States Patent and Trademark Office